US012367393B2

(12) United States Patent
Markram et al.

(10) Patent No.: US 12,367,393 B2
(45) Date of Patent: Jul. 22, 2025

(54) INTERPRETING AND IMPROVING THE PROCESSING RESULTS OF RECURRENT NEURAL NETWORKS

(71) Applicant: INAIT SA, Lausanne (CH)

(72) Inventors: Henry Markram, Lausanne (CH); Felix Schuermann, Grens (CH); John Rahmon, Lausanne (CH); Daniel Milan Lütgehetmann, Lausanne (CH); Constantin Cosmin Atanasoaei, Chavannes-pres-Renens (CH)

(73) Assignee: INAIT SA, Lausanne (CH)

( * ) Notice: Subject to any disclaimer, the term of this patent is extended or adjusted under 35 U.S.C. 154(b) by 0 days.

(21) Appl. No.: 18/656,669

(22) Filed: May 7, 2024

(65) Prior Publication Data

US 2024/0362480 A1    Oct. 31, 2024

Related U.S. Application Data

(63) Continuation of application No. 18/295,969, filed on Apr. 5, 2023, now Pat. No. 12,020,157, which is a
(Continued)

(51) Int. Cl.
*G06N 3/08* (2023.01)
*G06N 3/044* (2023.01)
*G06N 3/049* (2023.01)

(52) U.S. Cl.
CPC .............. *G06N 3/08* (2013.01); *G06N 3/044* (2023.01); *G06N 3/049* (2013.01)

(58) Field of Classification Search
CPC .......... G06N 3/08; G06N 3/044; G06N 3/049; G06N 3/047; G06N 3/084
See application file for complete search history.

(56) References Cited

U.S. PATENT DOCUMENTS 5,822,742 A    10/1998 Alkon et al.
7,321,882 B2    1/2008 Herbert
(Continued)

FOREIGN PATENT DOCUMENTS

| CN | 101669130 | 3/2010 |
|---|---|---|
| CN | 101719908 A | 6/2010 |

(Continued)

OTHER PUBLICATIONS

Chatzis et al., "The copula echo state network," Pattern Recognition, Jan. 2012, 45(1):570-7.
(Continued)

*Primary Examiner* — Sung S Ahn
(74) *Attorney, Agent, or Firm* — Fish & Richardson P.C.

(57) ABSTRACT

A method includes defining a plurality of different windows of time in a recurrent artificial neural network, wherein each of the different windows has different durations, has different start times, or has both different durations and different start times, identifying occurrences of topological patterns of activity in the recurrent artificial neural network in the different windows of time, comparing the occurrences of the topological patterns of activity in the different windows, and classifying, based on a result of the comparison, a first decision that is represented by a first topological pattern of activity that occurs in a first of the windows as less robust than a second decision that is represented by a second topological pattern of activity that occurs in a second of the windows.

18 Claims, 6 Drawing Sheets

Related U.S. Application Data continuation of application No. 16/710,080, filed on Dec. 11, 2019, now Pat. No. 11,651,210.

(56) References Cited

U.S. PATENT DOCUMENTS

| | | |
|---|---|---|
| 7,412,426 B2 | 8/2008 | Hercus |
| 8,818,923 B1 | 8/2014 | Hoffmann |
| 9,336,239 B1 | 5/2016 | Hoffmann et al. |
| 9,558,442 B2 | 1/2017 | Canoy et al. |
| 9,785,886 B1 | 10/2017 | Andoni et al. |
| 9,875,440 B1 | 1/2018 | Lamport |
| 10,019,506 B1 | 7/2018 | Li et al. |
| 10,153,806 B1 | 12/2018 | Petre et al. |
| 10,417,558 B1 | 9/2019 | Bauer et al. |
| 10,510,000 B1 | 12/2019 | Lamport |
| 10,621,364 B1 | 4/2020 | El Defrawy |
| 10,628,486 B2 | 4/2020 | Chu et al. |
| 10,650,047 B2 | 5/2020 | Yanagisawa |
| 10,885,020 B1 | 1/2021 | Ablitt |
| 10,922,510 B2 | 2/2021 | Tscherepanow et al. |
| 11,195,038 B2 | 12/2021 | Nunn et al. |
| 11,218,498 B2 | 1/2022 | Hajimirsadeghi et al. |
| 11,250,326 B1 | 2/2022 | Ko et al. |
| 11,278,413 B1 | 3/2022 | Lang |
| 11,569,978 B2 | 1/2023 | Hess et al. |
| 11,580,401 B2 | 2/2023 | Markram et al. |
| 11,615,285 B2 | 3/2023 | Reimann et al. |
| 11,651,210 B2 | 5/2023 | Henry et al. |
| 11,652,603 B2 | 5/2023 | Markram et al. |
| 11,663,478 B2 | 5/2023 | Markram et al. |
| 11,797,827 B2 | 10/2023 | Markram et al. |
| 11,816,553 B2 | 11/2023 | Markram et al. |
| 11,893,471 B2 | 2/2024 | Markram et al. |
| 11,972,343 B2 | 4/2024 | Markram et al. |
| 12,020,157 B2 | 6/2024 | Markram et al. |
| 12,113,891 B2 | 10/2024 | Hess Bellwald et al. |
| 12,147,904 B2 | 11/2024 | Markram et al. |
| 12,154,023 B2 | 11/2024 | Markram et al. |
| 2003/0140020 A1 | 7/2003 | Chen et al. |
| 2004/0015459 A1 | 1/2004 | Herbert |
| 2006/0112028 A1 | 5/2006 | Xiao et al. |
| 2006/0184471 A1 | 8/2006 | Minamino et al. |
| 2008/0152217 A1 | 6/2008 | Greer |
| 2008/0267188 A1 | 10/2008 | Furber et al. |
| 2009/0006060 A1 | 1/2009 | Rhodes |
| 2009/0012581 A1 | 1/2009 | Rhodes |
| 2009/0187736 A1 | 7/2009 | Raichelgauz et al. |
| 2014/0156901 A1 | 6/2014 | Raichelgauz et al. |
| 2015/0058352 A1 | 2/2015 | Brand |
| 2015/0206049 A1 | 7/2015 | Canoy et al. |
| 2015/0280906 A1 | 10/2015 | Shany et al. |
| 2015/0310303 A1 | 10/2015 | Andreopoulos et al. |
| 2015/0347870 A1 | 12/2015 | Andreopoulos et al. |
| 2015/0363689 A1 | 12/2015 | Henry et al. |
| 2016/0048756 A1 | 2/2016 | Hall et al. |
| 2016/0350648 A1 | 12/2016 | Gilad-Bachrach et al. |
| 2017/0024661 A1 | 1/2017 | Hunsberger et al. |
| 2017/0124452 A1 | 5/2017 | Tucker et al. |
| 2017/0139759 A1 | 5/2017 | Bandara |
| 2017/0213131 A1 | 7/2017 | Hammond et al. |
| 2017/0229117 A1 | 8/2017 | van der Made et al. |
| 2017/0249536 A1 | 8/2017 | Hillar et al. |
| 2018/0005111 A1 | 1/2018 | Chaudhari et al. |
| 2018/0018553 A1* | 1/2018 | Bach ............... G06F 40/279 |
| 2018/0053108 A1 | 2/2018 | Olabiyi et al. |
| 2018/0053114 A1 | 2/2018 | Adjaoute |
| 2018/0082171 A1 | 3/2018 | Merity et al. |
| 2018/0107922 A1 | 4/2018 | Paul et al. |
| 2018/0136912 A1 | 5/2018 | Venkataramani et al. |
| 2018/0157973 A1 | 6/2018 | El-Yaniv et al. |
| 2018/0165547 A1 | 6/2018 | Haung et al. |
| 2018/0197069 A1 | 7/2018 | Reimann et al. |
| 2018/0197076 A1 | 7/2018 | Paik et al. |
| 2018/0247198 A1 | 8/2018 | Vasudevan et al. |
| 2018/0336453 A1 | 11/2018 | Merity et al. |
| 2018/0373985 A1 | 12/2018 | Yang et al. |
| 2019/0012574 A1 | 1/2019 | Anthony et al. |
| 2019/0036678 A1 | 1/2019 | Ahmed |
| 2019/0042988 A1 | 2/2019 | Brown et al. |
| 2019/0044916 A1 | 2/2019 | Jones |
| 2019/0050726 A1 | 2/2019 | Azaria et al. |
| 2019/0122096 A1 | 4/2019 | Husain |
| 2019/0122140 A1 | 4/2019 | Sen |
| 2019/0171187 A1 | 6/2019 | Cella et al. |
| 2019/0171929 A1 | 6/2019 | Abadi et al. |
| 2019/0180187 A1 | 6/2019 | Rawal et al. |
| 2019/0197410 A1 | 6/2019 | Berry, II |
| 2019/0228300 A1 | 7/2019 | Cao et al. |
| 2019/0244348 A1 | 8/2019 | Buckler et al. |
| 2019/0265950 A1 | 8/2019 | Heeger et al. |
| 2019/0266246 A1 | 8/2019 | Wang et al. |
| 2019/0286074 A1 | 9/2019 | Hoffman |
| 2019/0304568 A1 | 10/2019 | Wei et al. |
| 2019/0312898 A1 | 10/2019 | Verma et al. |
| 2019/0335192 A1 | 10/2019 | Otto et al. |
| 2019/0354846 A1 | 11/2019 | Mellempudi et al. |
| 2019/0370647 A1 | 12/2019 | Doshi et al. |
| 2019/0377976 A1 | 12/2019 | Markram et al. |
| 2019/0377999 A1 | 12/2019 | Markram et al. |
| 2019/0378000 A1 | 12/2019 | Markram et al. |
| 2019/0378007 A1 | 12/2019 | Markram et al. |
| 2019/0378008 A1 | 12/2019 | Markram et al. |
| 2019/0392303 A1 | 12/2019 | Cherubini et al. |
| 2020/0011668 A1 | 1/2020 | Derhy et al. |
| 2020/0012927 A1 | 1/2020 | Raichelgauz et al. |
| 2020/0098135 A1 | 3/2020 | Ganjineh et al. |
| 2020/0117690 A1 | 4/2020 | Tran |
| 2020/0126126 A1 | 4/2020 | Briancon et al. |
| 2020/0134016 A1 | 4/2020 | Cao et al. |
| 2020/0184055 A1 | 6/2020 | Storm et al. |
| 2020/0210764 A1 | 7/2020 | Hamedi et al. |
| 2020/0228336 A1 | 7/2020 | Streit |
| 2020/0242444 A1 | 7/2020 | Zhang et al. |
| 2020/0285944 A1 | 9/2020 | Lee et al. |
| 2020/0302297 A1 | 9/2020 | Jaganathan et al. |
| 2020/0304284 A1 | 9/2020 | Markram et al. |
| 2020/0304285 A1 | 9/2020 | Hess et al. |
| 2020/0310400 A1 | 10/2020 | Jha et al. |
| 2020/0367810 A1 | 11/2020 | Shouldice et al. |
| 2020/0380335 A1* | 12/2020 | Neznal ............... G06N 3/044 |
| 2020/0402497 A1 | 12/2020 | Semonov et al. |
| 2021/0027163 A1 | 1/2021 | Baker |
| 2021/0049441 A1 | 2/2021 | Bronstein |
| 2021/0049446 A1 | 2/2021 | Gurumurthi et al. |
| 2021/0058547 A1 | 2/2021 | Puttamalla et al. |
| 2021/0097578 A1 | 4/2021 | Holmes et al. |
| 2021/0110115 A1 | 4/2021 | Hermann et al. |
| 2021/0182604 A1 | 6/2021 | Anthony et al. |
| 2021/0182653 A1 | 6/2021 | Markram et al. |
| 2021/0182654 A1 | 6/2021 | Markram et al. |
| 2021/0182655 A1 | 6/2021 | Markram et al. |
| 2021/0182657 A1 | 6/2021 | Markram et al. |
| 2021/0182681 A1 | 6/2021 | Markram et al. |
| 2021/0271319 A1 | 9/2021 | Lussier et al. |
| 2021/0319098 A1 | 10/2021 | Pogorelik et al. |
| 2021/0338007 A1 | 11/2021 | Choi et al. |
| 2021/0398621 A1 | 12/2021 | Stojevic et al. |
| 2022/0005332 A1 | 1/2022 | Metzler et al. |
| 2022/0012877 A1 | 1/2022 | Buckler et al. |
| 2022/0147760 A1 | 5/2022 | Dutta et al. |
| 2022/0148454 A1 | 5/2022 | Jaramaz et al. |
| 2022/0157436 A1 | 5/2022 | Harley et al. |
| 2022/0187847 A1 | 6/2022 | Cella et al. |
| 2022/0197306 A1 | 6/2022 | Cella et al. |
| 2022/0261593 A1 | 8/2022 | Yu et al. |
| 2022/0269346 A1 | 8/2022 | Hussami et al. |
| 2023/0019839 A1 | 1/2023 | Markram |
| 2023/0024925 A1 | 1/2023 | Markram et al. |
| 2023/0028511 A1 | 1/2023 | Markram et al. |
| 2023/0085384 A1 | 3/2023 | Lütgehetmann et al. |
| 2023/0171086 A1 | 3/2023 | Hess et al. |
| 2023/0297808 A1 | 3/2023 | Reimann et al. |
| 2023/0316077 A1 | 3/2023 | Markram et al. |
| 2023/0351196 A1 | 3/2023 | Markram et al. |

(56) References Cited

U.S. PATENT DOCUMENTS

| | | |
|---|---|---|
| 2023/0370244 A1 | 3/2023 | Markram et al. |
| 2024/0046077 A1 | 2/2024 | Markram et al. |
| 2024/0111994 A1 | 4/2024 | Markram et al. |
| 2024/0176985 A1 | 5/2024 | Markram et al. |
| 2024/0386265 A1 | 11/2024 | Markram et al. |
| 2025/0070956 A1 | 2/2025 | Hess Bellwald et al. |

FOREIGN PATENT DOCUMENTS

| | | |
|---|---|---|
| CN | 102859538 | 1/2013 |
| CN | 103988203 | 8/2014 |
| CN | 104318304 | 1/2015 |
| CN | 104335219 | 2/2015 |
| CN | 105095966 | 11/2015 |
| CN | 106156845 | 11/2016 |
| CN | 107247989 | 10/2017 |
| CN | 107423814 | 12/2017 |
| CN | 107844830 | 3/2018 |
| CN | 108348750 | 7/2018 |
| CN | 112567387 | 3/2021 |
| CN | 112567388 | 3/2021 |
| CN | 112567389 | 3/2021 |
| CN | 112567390 | 3/2021 |
| CN | 112585621 | 3/2021 |
| EP | 1283496 | 2/2003 |
| EP | 3340121 | 6/2018 |
| EP | 3803699 | 4/2021 |
| EP | 3803705 | 4/2021 |
| EP | 3803706 | 4/2021 |
| EP | 3803707 | 4/2021 |
| EP | 3803708 | 4/2021 |
| KR | 20210008417 | 1/2021 |
| KR | 20210008418 | 1/2021 |
| KR | 20210008419 | 1/2021 |
| KR | 20210008858 | 1/2021 |
| KR | 20210010894 | 1/2021 |
| TW | 201437945 | 10/2014 |
| TW | 201535277 | 9/2015 |
| TW | 201725519 | 7/2017 |
| TW | I608429 | 12/2017 |
| TW | 201928789 | 7/2019 |
| TW | 201935326 | 9/2019 |
| TW | 201937392 | 9/2019 |
| WO | WO 2007/137047 | 11/2007 |
| WO | WO 2016/206765 | 12/2016 |
| WO | WO 2017/083399 | 5/2017 |
| WO | WO 2017/197375 | 11/2017 |
| WO | WO 2017/200971 | 11/2017 |
| WO | WO 2018/058426 | 4/2018 |
| WO | WO 2018/175400 | 9/2018 |
| WO | WO 2019/238483 | 12/2019 |
| WO | WO 2019/238512 | 12/2019 |
| WO | WO 2019/238513 | 12/2019 |
| WO | WO 2019/238522 | 12/2019 |
| WO | WO 2019/238523 | 12/2019 |
| WO | WO 2020/187676 | 9/2020 |
| WO | WO 2020/187694 | 9/2020 |
| WO | WO 2021/116071 | 6/2021 |
| WO | WO 2021/116075 | 6/2021 |
| WO | WO 2021/116140 | 6/2021 |
| WO | WO 2021/116250 | 6/2021 |
| WO | WO 2021/116379 | 6/2021 |
| WO | WO 2021/116402 | 6/2021 |
| WO | WO 2021/116404 | 6/2021 |
| WO | WO 2021/116407 | 6/2021 |

OTHER PUBLICATIONS

Google.com [online], "Search Query: Cliques simplices cavities," available on or before Feb. 19, 2025, retrieved on Feb. 19, 2025, retrieved from URL <https://www.google.com/search?udm=36&q=cliques+simplices+cavities>, 4 pages.

Office Action in Chinese Appln. No. 202080036778.1, mailed on Dec. 30, 2024, 26 pages (with English translation).

Office Action in U.S. Appl. No. 16/710,266, mailed on Feb. 13, 2025, 33 pages.

Office Action in U.S. Appl. No. 18/295,959, mailed on Nov. 18, 2024, 14 pages.

Office Action in U.S. Appl. No. 18/527,555, mailed on Nov. 21, 2024, 52 pages.

Office Action in U.S. Appl. No. 17/454,347, mailed on Oct. 16, 2024, 25 pages.

Abbas et al., "Artificial Intelligence Conquering the next frontier of the digital world," Research Gate, Dec. 17, 2017, 15 pages.

Achard et al., "A Resilient, Low-Frequency, Small-World Human Brain Functional Network with Highly Connected Association Cortical Hubs," Journal of Neuroscience, Jan. 4, 2006, 26(1):63-72.

Aharoni et al., "Eigenvalues and homology of flag complexes and vector representations of graphs," Geom. Funct. Anal., Jul. 28, 2005, 15:555-566.

Alaniz, "Machiavellian Playbook for Artificial General Intelligence (AGI), Early Doctrine for AGI power," Research Gate, Aug. 2018, pp. 1-42.

Alaniz, "Remaking Einstein with a Dynamical Graph Rich Person Object Avatar Extraction Markup Language (intelligence as topological algebraic invariants, graph entropies, and dynamics)," Research Gate, Mar. 16, 2019, 14 pages.

Allswede et al., "Prenatal inflammation and risk for schizophrenia: A role for immune proteins in neurodevelopment," Development and Psychopathology, Aug. 2, 2018, 30: 1157-1178.

Andersen et al., "Overlapping clusters for distributed computation," In Proceedings of the Fifth ACM International Conference on Web Search and Data Mining, Feb. 8, 2012, 9 pages.

Angeli, "Symmetric functions for fast image retrieval with persistent homology," Math Meth Appl Sci., Apr. 24, 2018, 41:9567-9577.

Antonopoulos et al., "Evaluating performance of neural codes in neural communication networks," Neural Networks, Sep. 24, 2018, pp. 1-17.

Arai et al., "The Effects of Theta Precession on Spatial Learning and Simplicial Complex Dynamics in a Topological Model of the Hippocampal Spatial Map," PLOS Computational Biology, Jun. 19, 2014, 10(6): r1003651, 14 pages.

Astrivis [online], "Demo Scan Church Dec. 2016," Dec. 2, 2016, retrieved on Nov. 27, 2022, retrieved from URL <https://www.youtube.com/watch?v=xCgQ4aaBIGo>, 2 pages.

Bahraini et al., "Topological pattern selection in recurrent networks," Neural Networks, Feb. 9, 2012, 31:22-32.

Baker et al., "Designing neural network architectures using reinforcement learning," CoRR, Submitted on Nov. 7, 2016, arXiv:1611.02167, 18 pages.

Bale et al., "Efficient population coding of naturalistic whisker motion in the ventro- posterior medial thalamus based on precise spike timing," Front. Neural Circuits, Sep. 25, 2015, 9: 1-14.

Bardin et al., "Topological exploration of artificial neuronal network dynamics," Network Neuroscience, Jan. 24, 2019, pp. 1-28.

Baskararaja et al., "Subgraph matching using graph neural network," Journal of Intelligent Learning Systems and Applications, Nov. 28, 2012, 4(04):274-278.

Basset et al., "Network models in neuroscience," CoRR, Submitted on Jul. 31, 2018, arXiv:1807.1193, pp. 1-12.

Basset et al., "On the nature and use of models in network neuroscience," Nature Reviews, Jul. 12, 2018, 19:566-578.

Bassett et al., "Dynamic reconfiguration of human brain networks during learning," PNAS, Apr. 18, 2011, 108(18):7641-7646.

Bassett et al., "Network Neuroscience," Nat. Neurosci., Mar. 20, 2017, 20:353-364.

Baudot et al., "Topological Information Data Analysis," Entropy, Sep. 2019, 21:1-38.

Bauer et al., "Clear and Compress: Computing Persistent Homology in Chunks," Topological Methods in Data Analysis and Visualization III., 2014, pp. 103-117.

Bauer et al., "PHAT—Persistent Homology Algorithms Toolbox," J. Symb. Comput., Jan. 1, 2017, 78: 76-90.

Bauer et al., "Real-time ultra-low power ECG anomaly detection using an event-driven neuromorphic processor," IEEE transactions on biomedical circuits and systems, Nov. 11, 2019, 13(6):1575-82.

(56) References Cited

OTHER PUBLICATIONS

Bergomi et al., "Topological Graph persistence," Mathematics, Jul. 20, 2017, pp. 1-15.
Betzel, "Stability of spontaneous, correlated activity in mouse auditory cortex," PLOS: Computational Biology, Dec. 9, 2019, 1-25.
Bianconi et al., "Topological percolation on hyperbolic simplicial complexes," Phys. Rev. E, Nov. 21, 2018, 5:1-18.
Bienenstock et al., "A model of neocortex," Network Comput. Neural Syst., Jul. 27, 1994, 6:179-224.
Blanco et al., "A genetic algorithm to obtain the optimal recurrent neural network," International Journal of Approximate Reasoning, Jan. 2000, 23(1):67-83.
Brody et al., "Correlations without synchrony," Neural Comput., Oct. 1, 1999, 11:1537-1551.
Brown et al., "Structure of the Afferent Terminals in Terminal Ganglion of a Cricket and Persistent Homology," PLOS One, May 23, 2012, 7(5): e37278.
Bullmore et al., "Complex brain networks: graph theoretical analysis of structural and functional systems," Nat. Rev. Neurosci., Mar. 10, 2009, 10:186-198.
Busch et al., "Intrinsic temporal tuning of neurons in the optic tectum is shaped by multisensory experience," Journal of Neurophysiology, Sep. 5, 2019, pp. 1-23.
Cai et al., "Path-level network transformation for efficient architecture search," In International Conference on Machine Learning, Jul. 3, 2018, PMLR, 10 pages.
Chacholski et al., "On the topology of complexes of injective words," Journal of Applied and Computational Topology, Aug. 16, 2019, 21:1-16.
Chambers et al., "Higher-order synaptic interactions coordinate dynamics in recurrent networks," PLOS Computational Biology, Aug. 19, 2016, 12(8):e1005078, 23 pages.
Chella et al., "Representational Issues in the Debate on the Standard Model of the Mind," Association for the Advancement of Artificial Intelligence, Nov. 12, 2017, pp. 1-6.
Chen et al., "Neural Representation of Spatial Topology in the Rodent Hippocampus," Neural Computation, Jan. 2014, 26(1):1-39.
Chklovskii et al., "Cortical rewiring and information storage," Nature, Oct. 14, 2004, 431:782-788.
Choi et al., "A Survey of Binary Similarity and distance measures," Systemic, Cybernetics, and Informatics, Jan. 8, 2010, 8:43-48.
Choi et al., "Abnormal metabolic connectivity in the pilocarpine-induced epilepsy rat model: A multiscale network analysis based on persistent homology," NeuroImage, Oct. 1, 2014, 99:226-236.
Choudhary, "Approximation algorithms for Vietoris-Rips and Čech filtrations," Doctoral Thesis of Computer Science, Faculty of Mathematics and Computer Science, Heidelberg University, Dec. 14, 2017, 140 pages.
Chowdhury et al., "Path homologies of deep feedforward networks," CoRR, Submitted on Oct. 16, 2019, arXiv:1910.07617, pp. 1-6.
Chung et al., "Persistence Diagrams of Cortical Surface Data," Information Processing in Medical Imaging, 2009, pp. 386-397.
Coggan et al., "A Process for Digitizing and Simulating Biologically Realistic Oligocellular Networks Demonstrated for the Neuro-Glio-Vascular Ensemble," Neurosci, Sep. 25, 2018, 12:1-21.
Collins, "The case for emulating insect brains using anatomical "wiring diagrams" equipped with biophysical models of neuronal activity," Biological cybernetics, Dec. 1, 2019, 113: 465-75.
Cormen et al., "Introduction to Algorithms," Copyright 2001 by The Massachusetts Institute of Technology, 984 pages.
Courtney et al., "Dense Power-law Networks and Simplicial Complexes," CoRR, Submitted on Apr. 23, 2018, arXiv:1802.01465, pp. 1-16.
Crawford et al., "A theory on the role of π-electrons of docosahexaenoic acid in brain function: The six methylene-interrupted double bonds and the precision of neural signaling," Oilseeds & fats Crops and Lipids, May 21, 2018, pp. 1-14.
Crossley et al., "Cognitive relevance of the community structure of the human brain functional coactivation network," PNAS, Jun. 24, 2013, 110(28):11583-11588.
Curto et al., "Cell groups reveal structure of stimulus space," Plos Comput. Biol., Oct. 2008, 4(10):e100205.
Curto, "Relating network connectivity to dynamics: opportunities and challenges for theoretical neuroscience," Current Opinion in Neurobiology, Oct. 1, 2019, 58:11-20.
Curto, "What Can Topology Tell US About the Neural Code?," The American Mathematical Society, Jan. 2017, 54(1):63-78.
Dabaghian et al., "A topological paradigm for hippocampal spatial map formation using persistent homology," Plos Comput. Biol., Aug. 2012, 8(8):e1002581.
Dabaghian et al., "Reconceiving the hippocampal map as a topological template," Elife, Aug. 20, 2014, 3:e03476.
Davydov et al., "Neural Network Structures: Current and Future States," Research Gate, Feb. 2, 2018, pp. 1-6.
decharms et al., "Primary cortical representation of sounds by the coordination of action-potential timing," Nature, Jun. 13, 1996, 381(6583):610-613.
Djurfeldt et al., "Efficient generation of connectivity in neuronal networks from simulator-independent descriptions," Frontiers in Neuroinformatics, Mar. 28, 2014, 8(43):1-11.
Dlotko et al., "Topological analysis of the connectome of digital reconstructions of neural microcircuits," CoRR, Submitted on Jan. 7, 2016, arXiv:1601.01580, 1-28 pages.
Dlotko, "Directed clique topology," (slides are titled "Directed Complexes"), presented at BIRS workshop, video from 17w5043: Topological Methods in Brain Network Analysis, May 11, 2017, retrieved from < http://www.birs.ca/events/2017/5-day-workshops/17w5043/videos/watch/201705111127-Dlotko.html>, retrieved on Jul. 26, 2022, 26 pages.
Doborjeh et al., "Spiking Neural Network Modelling Approach Reveals How Mindfulness Training Rewires the Brain," Scientific Reports, Apr. 23, 2019, 9:1-15.
Docs.opencv.org [online], "Camera Calibration and 3D Reconstruction," retrieved on Oct. 5, 2022, retrieved from URL <https://docs.opencv.org/4.4.0/d9/doc/group_calib3d.html#ga549c2075fac14829ff4a58bc931c033d)>, 78 pages.
Docs.opencv.org [online], "Pose Estimation," available no later than Sep. 13, 2021, retrieved on Oct. 5, 2022, retrieved from URL <https://docs.opencv.org/4.x/d7/d53/tutoria_py_pose.html>, 3 pages.
Dongjiang et al., "DXSLAM: A Robust and Efficient Visual SLAM System with Deep Features," CoRR, Submitted on Aug. 12, 2020, arXive: 2008.05416v1, 8 pages.
Drakesmith et al., "Overcoming the effects of false positives and threshold bias in graph theoretical analyses of neuroimaging data," NeuroImage, Sep. 2015, 118:313-333.
Ebli, "A Notion of Harmonic Clustering in Simplicial Complexes," Laboratory for Topology and Neuroscience, École Polytechnique Fédérale de Lausanne, 1015 Lausanne, Switzerland, Oct. 17, 2019, 9 pages.
Ellis et al., "Describing High-Order Statistical Dependence Using "Concurrence Topology," With Application to Functional MRI Brain Data," Homology, Homotopy and Applications, 2014, 16(1):245-264.
Engel et al., "Temporal binding and the neural correlates of sensory awareness," Trends Cogn. Sci., Jan. 1, 2001, 5: 16-25.
Erdos and Renyi, "On random graphs, I," Math. Debrecen., 1959, 6:290-297.
Erdös et al., "On the evolution of random graphs," Publ. Math. Inst. Hung. Acad. Sci., Jan. 1960, 17-60.
Extended European Search Report in European Appln. No. 17174314.9, mailed on Dec. 14, 2017, 11 pages.
Extended European Search Report in European Appln. No. 17174316.4, mailed on Dec. 14, 2017, 12 pages.
Extended European Search Report in European Appln. No. 17174317.2, mailed on Dec. 14, 2017, 12 pages.
Fan et al., "A Brief History of Simulation Neuroscience," Front. Neuroinform., May 7, 2019, 13:1-28.

(56) References Cited

OTHER PUBLICATIONS

Feldbrugge et al., "Stochastic homology of Gaussian vs. non-Gaussian random fields: graphs towards Betti Nos. and persistence diagrams," Journal of Cosmology and Astroparticle Physics, Sep. 24, 2019, 49 pages.
Feng et al., "Persistent Homology of Geospatial Data: A Case Study with Voting," Jan. 30, 2019, pp. 1-29.
Garcia et al., "Reconfigurations within resonating communities of brain regions following TMS reveal different scales of processing," BioRxiv, Jan. 9, 2020, pp. 1-39.
Garcia et al., "Unsupervised classification of neural spikes with a hybrid multilayer artificial neural network," Journal of Neuroscience Methods, 1998, 82:59-73.
Garrison et al., "The (in)stability of functional brain network measures across thresholds," NeuroImage, Sep. 2015, 118:651-661.
Ghosh et al., "Design and Construction of a Brain-like computer: A New class of Frequency-Fractal Computing Using Wireless Communication in a Supramolecular Organic, Inorganic System," Information, 2014, 5, 28-100.
Ginestet et al., "Brain Network Analysis: Separating Cost from Topology Using Cost-Integration," PLOS One, Jul. 28, 2018, 2011, 6(7):e21570.
Github.com [online] "pytorch-tutorial/tutorials/03-advanced/image_captioning/," Oct. 2007, retrieved on Jan. 21, 2020, retrieved from URL: <https://github.com/yunjey/pytorch-tutorial/tree/master/tutorials/03-advanced/image_captioning>, 3 pages.
Github.com [online], "facebookresearch/detectron2," 2019, retrieved on Oct. 5, 2022, retrieved from URL <https://github.com/facebookresearch/detectron2>, 4 pages.
Giusti et al., "Clique topology reveals intrinsic geometric structure in neural correlations," Proc. Natl. Acad. Sci. U.S.A., Apr. 28, 2015, 112:13455-13460.
Giusti et al., "Two's company, three (or more) is a simplex," Journal of computational neuroscience, Aug. 2016, 41(1):1-14.
Gleeson et al., "Open Source Brain: A Collaborative Resource for Visualizing, Analyzing, Simulating, and Developing Standardized Models of Neurons and Circuits," Neuron, Aug. 7, 2019, 103(3):395-411.e5.
Gong, "Evolution to a small-world network with chaotic units," Europhysics Letters (EPL), Jul. 15, 2004, 67:328-333.
Goodman et al., "Brian: a simulator for spiking neural networks in python," Frontiers in Neuroinformatics, Sep. 30, 2008, 2(5):1-10.
Graves, "Adaptive computation time for recurrent neural networks," CoRR, Submitted on Mar. 29, 2016, arXiv: 1603.08983, 19 pages.
Gripon et al., "Sparse Neural Networks with Large Learning Diversity," IEEE Transactions on Neural Networks, Jul. 2011, 22(7):1087-1096.
Gros et al., "Semantic learning in autonomously active recurrent neural networks," Logic Journal of IGPL, Oct. 1, 2010, 18(5):686-704.
Gros, "Cognitive computation with autonomously active neural networks: an emerging field," Cognitive Computation, Mar. 2009, 1(1):77-90.
Gros, "Neural networks with transient state dynamics," New Journal of Physics, Apr. 30, 2007, 9(4):109, 21 pages.
Gros, "Self-sustained thought processes in a dense associative network," In Annual Conference on Artificial Intelligence, Sep. 11, 2005, Springer, Berlin, Heidelberg, 14 pages.
Guerreiro et al., "A Neural Key Generator for a Public Block Cipher," IEEE Ninth Brazilian Symposium on Neural Networks (SBRN '06), Oct. 23-27, 2006, Ribeirao Preto, BR, 143-147.
Guerreno, "The sleep onset transition: a connectivity investigation built on EEG source localization," Thesis for the Doctor of Philosophy, University of Zurich, Aug. 6, 2018, pp. 1-292.
Harris et al., "The neocortical circuit: themes and variations," Nat. Neurosci., Jan. 27, 2015, 18:170-181.
Hastings et al., "Challenges in the analysis of complex systems: introduction and overview," The European Physical Journal Special Topics, Dec. 28, 2017, 226:3185-3197.
Hatcher, "Algebraic Topology," Cambridge University Press, Feb. 2002, 556 pages.
Haun et al., "Conscious Perception as Integrated Information Patterns in Human Electrocorticography," eNeuro: Cognition and Behavior, Sep. 19, 2017, 4:2-18.
Hebb, "The Organization of Behavior: A Neuropsychological Theory," New York, NY: Wiley & Sons, 1949, pp. 1-365.
Holtmaat et al., "Experience-dependent structural synaptic plasticity in the mammalian brain," Nat. Rev. Neurosci., Sep. 10, 2009, 10:647-658.
Hu et al., "Local paths to global coherence: cutting networks down to size," Phys. Rev. E, Mar. 10, 2014, 89: 1-16.
Ibanze-Marcelo et al., "Topology highlights mesoscopic functional equivalence between imagery and perception: The case of hypnotizability," NeuroImage, Jun. 19, 2019, 437-449.
Ignacio et al., "Classification of Single-lead Electrocardiograms: TDA Informed Machine Learning," CoRR, Submitted on Nov. 25, 2019, arXiv:1911.12253, pp. 1-6.
Ignacio et al., "Tracing patterns and shapes in remittance and migration networks via persistent homology," EPJ Data Science, Jan. 5, 2019, 8:1-25.
International Preliminary Report on Patentability in International Appln. No. PCT/EP2020/056588, mailed on Sep. 30, 2021, 8 pages.
International Preliminary Report on Patentability in International Appln. No. PCT/EP2019/064593, mailed on Dec. 24, 2020, 11 pages.
International Preliminary Report on Patentability in International Appln. No. PCT/EP2019/064740, mailed on Dec. 24, 2020, 11 pages.
International Preliminary Report on Patentability in International Appln. No. PCT/EP2019/064741, mailed on Dec. 24, 2020, 9 pages.
International Preliminary Report on Patentability in International Appln. No. PCT/EP2019/064773, mailed Dec. 24, 2020, 11 pages.
International Preliminary Report on Patentability in International Appln. No. PCT/EP2019/064776, mailed on Dec. 24, 2020, 11 pages.
International Preliminary Report on Patentability in International Appln. No. PCT/EP2020/056686, mailed on Sep. 30, 2021, 10 pages.
International Preliminary Report on Patentability in International Appln. No. PCT/EP2020/085007, mailed on Jun. 23, 2022, 8 pages.
International Preliminary Report on Patentability in International Appln. No. PCT/EP2020/085016, mailed on Jun. 23, 2022, 11 pages.
International Preliminary Report on Patentability in International Appln. No. PCT/EP2020/085169, mailed on Jun. 23, 2022, 8 pages.
International Preliminary Report on Patentability in International Appln. No. PCT/EP2020/085200, mailed on Jun. 23, 2022, 9 pages.
International Preliminary Report on Patentability in International Appln. No. PCT/EP2020/085434, mailed on Jun. 23, 2022, 9 pages.
International Preliminary Report on Patentability in International Appln. No. PCT/EP2020/085716, mailed on Jun. 23, 2022, 11 pages.
International Preliminary Report on Patentability in International Appln. No. PCT/EP2020/085750, mailed on Jun. 23, 2022, 8 pages.
International Preliminary Report on Patentability in International Appln. No. PCT/EP2020/085754, mailed Jun. 23, 2022, 12 pages.
International Preliminary Report on Patentability in International Appln. No. PCT/EP2020/085762, mailed on Jun. 23, 2022, 7 pages.
International Preliminary Report on Patentability in International Appln. No. PCT/EP2022/073852, mailed on Mar. 28, 2024, 12 pages.
International Search Report and Written Opinion in International Appln. No. PCT/EP2019/064593, mailed on Sep. 6, 2019, 18 pages.
International Search Report and Written Opinion in International Appln. No. PCT/EP2019/064740, mailed on Sep. 6, 2019, 18 pages.
International Search Report and Written Opinion in International Appln. No. PCT/EP2019/064741, mailed on Sep. 6, 2019, 16 pages.
International Search Report and Written Opinion in International Appln. No. PCT/EP2019/064773, mailed on Sep. 6, 2019, 17 pages.
International Search Report and Written Opinion in International Appln. No. PCT/EP2019/064776, mailed on Sep. 6, 2019, 17 pages.

(56) References Cited

OTHER PUBLICATIONS

International Search Report and Written Opinion in International Appln. No. PCT/EP2020/056588, mailed on May 26, 2020, 12 pages.
International Search Report and Written Opinion in International Appln. No. PCT/EP2020/056686, mailed on May 26, 2020, 13 pages.
International Search Report and Written Opinion in International Appln. No. PCT/EP2020/085007, mailed on Mar. 24, 2021, 10 pages.
International Search Report and Written Opinion in International Appln. No. PCT/EP2020/085016, mailed on Mar. 24, 2021, 18 pages.
International Search Report and Written Opinion in International Appln. No. PCT/EP2020/085169, mailed on Mar. 18, 2021, 15 pages.
International Search Report and Written Opinion in International Appln. No. PCT/EP2020/085200, mailed on Apr. 9, 2021, 15 pages.
International Search Report and Written Opinion in International Appln. No. PCT/EP2020/085434, mailed on Mar. 24, 2021, 16 pages.
International Search Report and Written Opinion in International Appln. No. PCT/EP2020/085716, mailed on Mar. 25, 2021, 14 pages.
International Search Report and Written Opinion in International Appln. No. PCT/EP2020/085716, mailed on Mar. 25, 2021, 18 pages.
International Search Report and Written Opinion in International Appln. No. PCT/EP2020/085750, mailed on Apr. 6, 2021, 10 pages.
International Search Report and Written Opinion in International Appln. No. PCT/EP2020/085754, mailed Apr. 6, 2021, 14 pages.
International Search Report and Written Opinion in International Appln. No. PCT/EP2020/085762, mailed on Apr. 6, 2021, 9 pages.
International Search Report and Written Opinion in International Appln. No. PCT/EP2022/073852, mailed on Dec. 9, 2022, 18 pages.
Ivancevic et al., "Tensor-Centric Warfare II: Entropic Uncertainty Modeling," Intelligent Control and Automation, May 30, 2018, 9:30-51.
Ivancevic et al., "Tensor-Centric Warfare V: Topology of Systems Confrontation," Intelligent Control Automation, Feb. 28, 2019, 10:13-45.
Jozefowicz et al., "An Empirical Exploration of Recurrent Network Architectures," Proceedings of the 32nd International Conference on Machine Learning, 2015, 37:1-9.
Judge, "Prefix "Re-Cognition" as prelude to fixing sustainability—"pro" vs. "con"? Speculative review of missing emphasis potentially vital for psychosocial balance," Research Gate, Jul. 16, 2017, pp. 1-22.
Kahle, "Sharp vanishing thresholds for cohomology of random flag complexes," Ann. Of Math., May 2014, 179(3):1085-1107.
Kanari et al., "A Topological Representation of Branching Neuronal Morphologies," Neuroinformatics, Oct. 3, 2017, 11 pages.
Kanari et al., "Quantifying topological invariants of neuronal morphologies," CoRR, Submitted on Mar. 28, 2016, arXiv:1603.08432, 15 pages.
Kartun-Giles, "Beyond the clustering coefficient: A topological analysis of node neighborhoods in complex networks," Chaos, Solitons & Fractals: X, Feb. 16, 2019, 1:1-12.
Kastanenka et al., "A roadmap to integrate astrocytes into Systems Neuroscience," Gila, Wiley Periodicals, Apr. 9, 2019, pp. 1-22.
Khajezade et al., "A Game-Theoretical Network Formation Model for C. elegans Neural Network," Frontiers in Computational Neuroscience, Jul. 9, 2019, 13:1-12.
Khalid et al., "Tracing the evolution of multi-scale functional networks in a mouse model of depression using persistent brain network homology," NeuroImage, Nov. 1, 2014, 101:351-363.
Khan et al., "Learning from Privacy Preserved Encrypted Data on Cloud Through Supervised and Unsupervised Machine Learning," In 2019 2nd International Conference on Computing, Mathematics and Engineering Technologies (iCoMET), IEEE, Jan. 30, 2019, pp. 1-5.
Kim et al., "Morphological brain network assessed using graph theory and network filtration in deaf adults," Hearing Research, Sep. 2014, 315:88-98.
Knoblauch et al., "Memory capacities for synaptic and structural plasticity," Neural Comput., Feb. 2010, 22:289-341.
Kulakov, "Features of a Simple Psychophysiological Reaction," Human Physiology, Jun. 15, 2017, 44:412-417.
Kumarashinghe, "Deep learning and deep knowledge representation in Spiking Neural Networks for Brain-Computer Interface," Neural Networks, Sep. 20, 2019, 121:169-185.
Kumbhar et al., "CoreNeuron: An Optimized Compute Engine for the NEURON Simulator," Frontiers in Neuroinformatics, Sep. 4, 2019, pp. 1-27.
Kvam, "A geometric framework for modeling dynamic decisions among arbitrarily many alternatives," Journal of Mathematical Psychology, Aug. 1, 2019, 91:14-37.
Langer et al., "The Problem of Thresholding in Small-World Network Analysis," PLOS One, Jan. 3, 2013, 8(1):e53199.
Latora et al., "Efficient behavior of small-world networks," Phys. Rev. Lett., Oct. 17, 2001, 87:1-4.
Le Be et al., "Spontaneous and evoked synaptic rewiring in the neonatal neocortex," Proc. Natl. Acad. Sci. U.S.A., Aug. 29, 2006, 103:13214-13219.
Lee et al., "Discriminative persistent homology of brain networks," 2011 IEEE International Symposium on Biomedical Imaging: From Nano to Macro, Mar. 30, 2011, pp. 841-844.
Lee et al., "Detecting highly overlapping community structure by greedy clique expansion," CoRR, Submitted on Feb. 9, 2010, arXiv:1002.1827, 10 pages.
Lena et al., "Deep spatio-temporal architectures and learning for protein structure prediction," Advances in neural information processing systems, 2012, 25, 9 pages.
Levi, "A short course on Algebraic topology geared towards applications to Neuroscience," University of Aberdeen, Jul. 18, 2017, pp. 1-14.
Li et al., "Ternary weight networks," CoRR, Submitted on May 16, 2016, arXiv:1605.04711, 5 pages.
Liang et al., "Interpretable Structure-Evolving LSTM," 2017 IEEE Conference on Computervision and Pattern Recognition (CVPR), 2017, pp. 2175-2184.
Lin et al., "Organizing principles of real-time memory encoding: neural clique assemblies and universal neural codes," TRENDS in Neurosciences, Jan. 2006, 29(1):48-57.
Luccioli et al., "Modeling driver cells in developing neural networks," PLOS Computational Biology, Nov. 2, 2018, pp. 1-31.
Lucky Robot [online], "ORB SLAM3: Ar demo," Feb. 23, 2021, retrieved on Nov. 27, 2022, retrieved from URL <https://www.youtube.com/watch?v=c1ExX_IA5tM>, 2 pages [Video Submission].
Luczak et al., "Packetbased communication in the cortex," Nat. Rev. Neurosci., Oct. 28, 2015, 16:745-755.
Ludermir et al., "An optimization methodology for neural network weights and architectures," IEEE Transactions on Neural Networks, Nov. 13, 2006, 17(6):1452-9.
Lutgehetmann et al., "Computing Persistent Homology of Directed Flag Complexes," Algorithms, Jan. 7, 2020, 1:1-18.
Lynn et al., "The physics of brain network structure, function, and control," Nature Reviews, May 27, 2019, 1:318-332.
Mardones, "Persistence Steenrod modules," ArXiv Mathematics, Dec. 12, 2018, pp. 1-10.
Maria, "Algorithms and data structures in computational topology," Thesis for the Doctoral, Université Nice Sophia Antipolis, Oct. 28, 2014, 205 pages.
Markram et al., "Reconstruction and simulation of neocortical microcircuitry," Cell, Oct. 8, 2015, 163:456-492.
Masulli et al., "Algebro-topological invariants in network theory," Int. J. Complex Systems in Science, Sep. 2015, 5(1):13-17.
Masulli et al., "Dynamics of evolving feed-forward neural networks and their topological invariants," Network and Parallel Computing, Aug. 13, 2016, pp. 99-106.

(56) References Cited

OTHER PUBLICATIONS

Masulli et al., "The topology of the directed clique complex as a network invariant," Springer Plus, Dec. 2016, 5(1):1-2.
Mathworld.wolfram.com [online], "Adjacency Matrix," 2016, retrieved via Internet Archive on Apr. 8, 2022, retrieved from <https://web.archive.org/web/20160311204902/https://mathworld.wolfram.com/AdjacencyMatrix.html>, 2 pages.
McCoss, "Agency of Life, Entropic Gravity and Phenomena Attributed to "Dark Matter"," Journal of Quantum Information Science, Jun. 15, 2017, 7:67-75.
McCoss, "Lithium Quantum Consciousness," Journal of Quantum Information Science, Nov. 8, 2017, 7:125-139.
Medaglia et al., "Cognitive Network Neuroscience," Journal of Cognitive Neuroscience, Aug. 1, 2015, 27(8): 1471-1491.
Mehta, "Storing and retrieving long-term memories: cooperation and competition in synaptic dynamics," Advances in Physics: X, Jul. 19, 2018, 3:756-790.
Meyer et al., "Cell type-specific thalamic innervation in a col. of rat vibrissal cortex," Cereb. Cortex, Jun. 9, 2010, 20: 2287-2303.
Millán et al., "Complex Network Geometry and Frustrated Synchronization," Scientific Reports, Jul. 2, 2018, 8:1-10.
Millan et al., "Synchronization in network geometries with finite spectral dimension," CoRR, Submitted on Jan. 31, 2019, arXiv:1811.03069, pp. 1-15.
Miller et al., "Visual stimuli recruit intrinsically generated cortical ensembles," Proc. Natl. Acad. Sci. U.S.A., Sep. 8, 2014, pp. E4053-E4061.
Milo et al., "Network Motifs: Simple Building Blocks of Complex Networks," Science, Oct. 25, 2002, 298(5594):824-827.
Minkovich et al., "Programming time-multiplexed reconfigurable hardware using a scalable neuromorphic compiler," IEEE transactions on neural networks and learning systems, Apr. 11, 2012, 23(6):889-901.
Miura et al., "Sparse Parallel Algorithms for Recognizing Touch Topology on Curved Interactive Screens," IEEE Access, Jul. 31, 2017, 5:14889-14897.
Muller et al., "Neocortical plasticity: an unsupervised cake but No. free lunch," 33rd Conference on Neural Information Processing Systems, Vancouver, Canada, Nov. 2019, 6 pages.
Munkres, "Elements of Algebraic Topology," Massachusetts Institute of Technology, 1984, Addison-Wesley Publishing Company, 233 pages.
Mur-Artal et al., "ORB-SLAM: a Versatile and Accurate Monocular SLAM System," IEEE transactions on robotics, Oct. 5, 2015, 31(5):1147-63.
Mur-Artal et al., "ORB-SLAM2: An Open-Source SLAM system for Monocular, Stereo, and RGB-D Cameras," CoRR, Submitted on Jun. 19, 2017, arXiv:1610.06475, 9 pages.
Nazeran et al., "Neural Networks in Processing and Analysis of Biomedical Signals," Nonlinear Biomedical Signal Processing, Fuzzy Logic, Neural Networks, and New Algorithms, IEEE, Metin Akay (. ed), Jul. 2000, Chapter 4, pp. 69-97.
Nolte, "Cortical reliability amid noise and chaos," Nature Communications, Aug. 22, 2019, 10:1-15.
Norton, "Dynamics of Reaction-Diffusion Oscillators in Star and other Networks with Cyclic Symmetries Exhibiting Multiple Clusters," Physical Review Letters, Oct. 4, 2019, 123: 1-6.
Office Action in Chinese Appln. No. 201980053140.6, mailed on Apr. 29, 2024, 15 pages (with English translation).
Office Action in Chinese Appln. No. 201980053141.0, mailed on Apr. 30, 2024, 19 pages (with English translation).
Office Action in Chinese Appln. No. 201980053463.5, mailed on May 23, 2024, 7 pages (with English translation).
Office Action in Chinese Appln. No. 201980053465.4, mailed on May 23, 2024, 7 pages (with English translation).
Office Action in Chinese Appln. No. 201980054063.6, mailed on May 23, 2024, 7 pages (with English translation).
Office Action in Chinese Appln. No. 202080035412.2, mailed on Jan. 30, 2024, 22 pages (with English translation).
Office Action in Chinese Appln. No. 202080035412.2, mailed on Sep. 24, 2024, 9 pages (with English translation).
Office Action in European Appln. No. 19728992.9, mailed on Jan. 24, 2023, 8 pages.
Office Action in European Appln. No. 19728993.7, mailed on Jan. 24, 2023, 8 pages.
Office Action in European Appln. No. 20711136.0, mailed on Sep. 17, 2024, 8 pages.
Office Action in European Appln. No. 20711154.3, mailed on Sep. 13, 2024, 6 pages.
Office Action in European Appln. No. 20829805.9, mailed on Sep. 14, 2023, 10 pages.
Office Action in Korean Appln. No. 2020/7035845, mailed on Feb. 16, 2022, 9 pages (with English translation).
Office Action in Korean Appln. No. 2020-7035843, mailed on Jan. 27, 2022, 9 pages (with English translation).
Office Action in Korean Appln. No. 2020-7035844, mailed on Feb. 17, 2022, 6 pages (with English translation).
Office Action in Korean Appln. No. 2020-7035846, mailed on Feb. 15, 2022, 6 pages (with English translation).
Office Action in Korean Appln. No. 2020-7035847, mailed on Aug. 10, 2022, 5 pages (with English translation).
Office Action in Korean Appln. No. 2020-7035847, mailed on Feb. 15, 2022, 11 pages (with English translation).
Office Action in Taiwanese Appln. No. 108119813, mailed on Jun. 29, 2020, 17 pages (with machine translation).
Office Action in Taiwanese Appln. No. 108119813, mailed on May 19, 2021, 8 pages (with machine translation).
Office Action in Taiwanese Appln. No. 109143238, mailed on Dec. 1, 2021, 18 pages (with machine translation).
Office Action in Taiwanese Appln. No. 109143239, mailed on Nov. 29, 2021, 17 pages (with machine translation).
Office Action in Taiwanese Appln. No. 109143240, mailed on Dec. 24, 2021, 13 pages (with machine translation).
Office Action in Taiwanese Appln. No. 109143242, mailed on Nov. 26, 2021, 3 pages (with machine translation).
Office Action in Taiwanese Appln. No. 109143863, mailed on Mar. 1, 2022, 13 pages (with machine translation).
Office Action in U.S. Appl. No. 15/864,146, mailed on Dec. 8, 2021, 73 pages.
Office Action in U.S. Appl. No. 15/864,146, mailed on Jan. 13, 2021, 37 pages.
Office Action in U.S. Appl. No. 15/864,146, mailed on Jun. 3, 2021, 55 pages.
Office Action in U.S. Appl. No. 16/004,635, mailed on Aug. 3, 2022, 24 pages.
Office Action in U.S. Appl. No. 16/004,635, mailed on Jan. 23, 2023, 24 pages.
Office Action in U.S. Appl. No. 16/004,635, mailed on Jun. 3, 2021, 44 pages.
Office Action in U.S. Appl. No. 16/004,635, mailed on Nov. 24, 2021, 34 pages.
Office Action in U.S. Appl. No. 16/004,671, mailed on Jun. 28, 2023, 39 pages.
Office Action in U.S. Appl. No. 16/004,671, mailed on May 26, 2022, 43 pages.
Office Action in U.S. Appl. No. 16/004,671, mailed on Nov. 17, 2021, 40 pages.
Office Action in U.S. Appl. No. 16/004,671, mailed on Oct. 27, 2022, 40 pages.
Office Action in U.S. Appl. No. 16/004,757, mailed on Dec. 20, 2021, 31 pages.
Office Action in U.S. Appl. No. 16/004,757, mailed on Jul. 14, 2022, 30 pages.
Office Action in U.S. Appl. No. 16/004,757, mailed on Jun. 8, 2021, 26 pages.
Office Action in U.S. Appl. No. 16/004,757, mailed on Mar. 29, 2023, 36 pages.
Office Action in U.S. Appl. No. 16/004,796, mailed on Apr. 8, 2021, 35 pages.
Office Action in U.S. Appl. No. 16/004,796, mailed on Aug. 4, 2022, 45 pages.

(56) References Cited

OTHER PUBLICATIONS

Office Action in U.S. Appl. No. 16/004,796, mailed on Dec. 15, 2023, 33 pages.
Office Action in U.S. Appl. No. 16/004,796, mailed on Feb. 23, 2023, 31 pages.
Office Action in U.S. Appl. No. 16/004,796, mailed on Jun. 29, 2023, 31 pages.
Office Action in U.S. Appl. No. 16/004,796, mailed on May 10, 2024, 40 pages.
Office Action in U.S. Appl. No. 16/004,796, mailed on Sep. 16, 2021, 46 pages.
Office Action in U.S. Appl. No. 16/004,796, mailed on Sep. 24, 2024, 75 pages.
Office Action in U.S. Appl. No. 16/004,837, mailed on Jun. 6, 2022, 8 pages.
Office Action in U.S. Appl. No. 16/356,391, mailed on Mar. 8, 2022, 10 pages.
Office Action in U.S. Appl. No. 16/356,391, mailed on Nov. 9, 2021, 13 pages.
Office Action in U.S. Appl. No. 16/356,478, mailed on Mar. 3, 2022, 5 pages.
Office Action in US Appln. No. 16/710, 205, mailed on Oct. 26, 2022, 51 pages.
Office Action in U.S. Appl. No. 16/710,058, mailed on Sep. 9, 2022, 14 pages.
Office Action in U.S. Appl. No. 16/710,176, mailed on Jun. 9, 2022, 7 pages.
Office Action in U.S. Appl. No. 16/710,205, mailed on May 10, 2023, 37 pages.
Office Action in U.S. Appl. No. 16/710,266, mailed on Apr. 12, 2023, 41 pages.
Office Action in U.S. Appl. No. 16/710,266, mailed on Aug. 9, 2024, 33 pages.
Office Action in U.S. Appl. No. 16/710,266, mailed on Jan. 29, 2024, 35 pages.
Office Action in U.S. Appl. No. 16/710,266, mailed on Nov. 17, 2022, 32 pages.
Office Action in U.S. Appl. No. 18/161,414, mailed on Dec. 21, 2023, 33 pages.
Office Action in U.S. Appl. No. 18/167,958, mailed on Feb. 15, 2024, 7 pages.
Opris et al., "What Is the Evidence for Inter-laminar Integration in a Prefrontal Cortical Minicolumn?," Frontiers in Neuroanatomy, Dec. 14, 2017, 11: 1-11.
Pajevic et al., "The organization of strong links in complex networks," Nat. Phys., Mar. 11, 2012, 8:429-436.
Palm et al., "On the significance of correlations among neuronal spike trains," Biol. Cybern., Jun. 1, 1988, 59:1-11.
Panda et al., "Learning to Recognize Actions from Limited Training Examples Using a Recurrent Spiking Neural Model," CoRR, Submitted on Oct. 19, 2017, arXiv:1710.07354, 17 pages.
Paredes-Valles et al., "Unsupervised Learning of a Hierarchical Spiking Neural Network for Optical Flow Estimation: From Events to Global Motion Perception," IEEE Transactions on Pattern Analysis and Machine Intelligence, 2018, 14 pages.
Park et al., "CNN (Convolutional Neural Network) based in-loop filter in HEVC," In Proceedings of the Korean Society of Broadcast Engineers Conference 2016, The Korean Institute of Broadcast and Media Engineers, 2016, pp. 369-372 (with English Abstract).
Patel et al., "Generative Design of Electromagnetic Structures Through Bayesian Learning," IEEE Transactions on Magnetics, Oct. 20, 2017, 54:1-4.
Paugam-Moisy et al., "Delay learning and polychronization for reservoir computing," Neurocomputing, Feb. 1, 2008, 71:1143-1158.
Pedregosa et al., "Scikit-learn: machine learning in Python," J. Mach. Learn. Res., Oct. 2010, 12:2825-2830.
Peng, "High-throughput microcircuit analysis of individual human brains through next-generation multineuron patch-clamp," BioRxiv, Jan. 1, 2019, pp. 1-49.
Perin et al., "A synaptic organizing principle for cortical neuronal groups," Proc. Natl. Acad. Sci. U.S.A., Mar. 29, 2011, 108:5419-5424.
Peters et al., "The projection of the lateral geniculate nucleus to area 17 of the rat cerebral cortex. I General description.," J. Neurocytol., Feb. 1976, 5:63-84.
Peters et al., "The projection of the lateral geniculate nucleus to area 17 of the rat cerebral cortex. V. Degenerating axon terminals synapsing with Golgi impregnated neurons," J Neurocytol., 1979, 8:331-357.
Petlevski, "Modeling the Model: the World Beyond the Immediate Sensorium," Proceedings of the 20th International Multiconference Information Society, Oct. 18, 2017, pp. 44-47.
Petri et al., "Homological scaffolds of brain functional networks," J. R. Soc. Interface, Dec. 6, 2014, 11(101):20140.
Petri et al., "Simplicial Activity Driven Model," Phys. Rev. Lett., Nov. 29, 2018, 121:1-5.
Pirino et al., "A topological study of repetitive co-activation networks in in vitro cortical assemblies," Physical Biology, Jan. 5, 2015, 12(1):016007.
Planas et al., "Accelerating Data Analysis in Simulation Neuroscience with Big Data Technologies," International Conference on Computational Science, Jun. 1, 2018, pp. 363-377.
Popa, "Psychology 2.0: The Emergence of Individuality," Sep. 2019, pp. 1-6.
Prentner, "Consciousness and Topologically Structured Phenomenal Spaces," Consciousness and Cognition, Feb. 26, 2019, 70:25-38.
Ramaswamy et al., "The neocortical microcircuit collaboration portal: a resource for rat somatosensory cortex," Front. Neural Circuits, Oct. 8, 2015, 9:1-14.
Rawal et al., "From nodes to networks: Evolving recurrent neural networks," CoRR, Submitted on Mar. 12, 2018, arXiv:1803.04439, 8 pages.
Reimann et al., "An algorithm to predict the connectome of neural microcircuits," Front. Comput. Neurosci., Oct. 8, 2015, 9:1-18.
Reimann et al., "Cliques of Neurons Bound into Cavities Provide a Missing Link between Structure and Function," Frontiers in Computational Neuroscience, Jun. 12, 2017, 11:1-16.
Renart et al., "The asynchronous state in cortical circuits," Science 327, Jan. 29, 2010, 587-590.
Rosenbaum et al., "The spatial structure of correlated neuronal variability," Nat. Neurosci., Oct. 21, 2016, 20:107-114.
Salnikov et al., "Simplicial complexes and complex systems," European Journal of Physics, Nov. 14, 2018, 40(1):014001.
Santos et al., "Topological phase transitions in functional brain networks," Physical Review E, Sep. 30, 2019, 100: 1-17.
Saucan et al., "Forman's Ricci Curvature—From Networks to Hypernetworks," vol. 1, Proceedings The 7th International Conference on Complex Networks and Their Applications, ArXiv, Oct. 17, 2018, 13 pages.
Schoenberg et al., "Mapping Meditative States and Stages with Electrophysiology: Concepts, Classifications, and Methods," Current Opinion in Psychology, Oct. 18, 2018, 28:211-217.
SciPy.org [online], "SciPy: Open Source Scientific Tools for Python," available on or before Mar. 9, 2001, via Internet Achieve: Wayback Machine URL <https://web.archive.org/web/20010309040805/http://www.scipy.org/>, retrieved on Jan. 17, 2020, <https://www.scipy.org/citing.html>.
See et al., "Coordinated neuronal ensembles in primary auditory cortical columns," Elife Sciences, Jun. 5, 2018, pp. 1-33.
Shepherd et al., "Geometric and functional organization of cortical circuits," Nat. Neurosci., May 8, 2005, 8:782-790.
Singh et al., "Topological analysis of population activity in visual cortex," Journal of Vision, Jun. 2008, 8(8):11, 18 pages.
Sizemore et al., "The importance of the whole: Topological data analysis for the network neuroscientist," Network Neuroscience, Oct. 17, 2018, 3:1-18.
Sizemore et al., "Cliques and cavities in the human connectome," Journal of computational neuroscience, Feb. 2018, 44(1):115-45.
Skardal et al., "Abrupt Desynchronization and Extensive Multistability in Globally Coupled Oscillator Simplexes," Physical Review Letters 122, Jun. 19, 2019, pp. 1-6.

(56) References Cited

OTHER PUBLICATIONS

Song et al., "Highly nonrandom features Of synaptic connectivity in local cortical circuits," PLOS Biol., Mar. 1, 2005, 3:0507-0519.
Srivastava et al., "Dropout: a simple way to prevent neural networks from overfitting," The journal of machine learning research, Jan. 2014, 15(1):1929-58.
Stepanyants et al., "Neurogeometry and potential synaptic connectivity," Trends in Neurosci., Jun. 2, 2005, 28:387-394.
Stolz, "Computational Topology in Neuroscience," Dissertation for the Degree of Master of Science in Mathematical Modelling & Scientific Computing at the University of Oxford, Sep. 2014, 77 pages.
Suarez, "The interaction between task goals and the representation of choice options in decision-making," Thesis for the degree of Doctor of Philosophy, University College of London, Sep. 2017, pp. 1-176.
Sun et al., "Runtime detection of activated polychromous neuronal group towards its spatiotemporal analysis," 2015 International Joint Conference on Neural Networks, Jul. 12-17, 2015, 1-8.
Timotheou, "The random neural network: a survey," The Computer Journal, Mar. 2010, 53(3):251-67.
Timsit et al., "Nervous-Like Circuits in the Ribosome Facts, Hypotheses and Perspectives," Int. J. Mol. Sci, Jun. 14, 2019, 20:1-22.
Tozzi et al., "Brain Projective Reality: Novel Clothes for the Emperor, Reply to comments of Topodynamics of metastable brains," Physics of Life Reviews, Jun. 28, 2017, pp. 1-11.
Tran et al., "Scale-variant topological information for characterizing the structure of complex networks," Physical Review E, Sep. 18, 2019, 100:1-18.
Turner, "Rips filtrations for quasimetric spaces and asymmetric functions with stability results," Algebraic & Geometric Topology, May 21, 2019, 19:1135-1170.
Tyukin et al., "High-Dimensional Brain: A Tool for Encoding and Rapid Learning of Memories by Single Neurons," Bull Math Biol., Mar. 19, 2018, 11:4856-4888.
Varshney et al., "Structural properties of the caenorhabditis elegans neuronal network," PLoS Comput. Biol., Feb. 3, 2011, 7:1-22.
Velazquez et al., "On a Simple General Principle of Brain Organization," Frontiers in Neuroscience, Oct. 15, 2019, 13:1-16.
Wang et al., "Topological recurrent neural network for diffusion prediction," In2017 IEEE International Conference on Data Mining (ICDM), Nov. 18, 2017, pp. 475-484.
Wijaya et al., "Finding an appropriate equation to measure similarity between binary vectors: case studies on Indonesian and Japanese herbal medicines," BMC bioinformatics, Dec. 2016,17:1-19.
Wikipedia.org [online], "DBSCAN," retrieved on Oct. 5, 2022, retrieved from URL <https://en.wikipedia.org/wiki/DBSCAN>, 8 pages.
Wikipedia.org [online], "Harris corner detector," retrieved on Oct. 5, 2022, retrieved on Oct. 5, 2022, retrieved from URL <https://en.wikipedia.org/wiki/Harris_corner_detector>, 6 pages.
Wikipedia.org [online], "OPTICS algorithm," retrieved Oct. 5, 2022, retrieved from URL <https://en.wikipedia.org/wiki/OPTICS_algorithm>, 6 pages.
Wikipedia.org [online], "Scale-invariant feature transform," retrieved on Oct. 5, 2022, retrieved from URL <https://en.wikipedia.org/wiki/Scale-invariant_feature_transform>, 19 pages.
Willshaw et al., "Nonholographic associative memory," Nature, Jun. 7, 1969, pp. 960-963.
Woodward et al., "A Reservoir Computing approach to Image Classification using Coupled Echo State and Back-Propagation Neural Networks," International conference image and vision computing, Auckland, New Zealand, Nov. 29, 2011, 6 pages.
Yang et al., "Convolutional Neural Networks with Alternately Upmailed on Clique," 2018 IEEE/CVF Conference on Computer Vision and Pattern Recognition, 2018, pp. 2413-2422.
Yang et al., "Road detection and centerline extraction via deep recurrent convolutional neural network U-Net," IEEE Transactions on Geoscience and Remote Sensing, May 14, 2019, 57(9):7209-20.
Young, "Standard Laterality Models: Neo-Eriksonian Perspectives," Chapter 8, Causality and Development, Jan. 2019, pp. 147-179.
Office Action in U.S. Appl. No. 18/295,959, mailed on Mar. 5, 2025, 12 pages.

\* cited by examiner

INTERPRETING AND IMPROVING THE PROCESSING RESULTS OF RECURRENT NEURAL NETWORKS

CROSS-REFERENCE TO RELATED APPLICATIONS

This application is a continuation of U.S. application Ser. No. 18/295,969, filed Apr. 5, 2023, (now allowed), which is a continuation of U.S. application Ser. No. 16/710,080, filed Dec. 11, 2019 (now U.S. Pat. No. 11,651,210), the contents of both of which are hereby incorporated by reference in their entirety.

TECHNICAL FIELD

This invention relates to recurrent neural networks, and more particularly to interpreting and/or improving the robustness of decision making in recurrent neural networks.

BACKGROUND

Artificial neural networks are devices that are inspired by the structure and functional aspects of networks of biological neurons. In particular, artificial neural networks mimic the information encoding and other processing capabilities of networks of biological neurons using a system of interconnected constructs called nodes. The arrangement and strength of connections between nodes in an artificial neural network determines the results of information processing or information storage by the artificial neural network.

Neural networks can be trained to produce a desired signal flow within the network and achieve desired information processing or information storage results. In general, training a neural network will change the arrangement and/or strength of connections between nodes during a learning phase. The training will be directed to achieving certain processing results. The processing results should be consistent with a set of examples, i.e., a training set. A neural network can be considered trained when sufficiently appropriate processing results are achieved by the neural network for given sets of inputs.

Because training is fundamental to the processing performed by neural networks, neural networks are generally unable to process data that deviates in form or in type from the data in the training set. Indeed, even when the same type of content is present, seemingly insignificant perturbations—at least in the opinion of humans—can lead to dramatically different processing results.

An example are the so-called "adversarial examples" in image classification. Many image classifiers are sensitive to small (once again, in the opinion of human observers) non-random perturbations of the input data. Although an image classifier may correctly classify one image, a small perturbation of that same image may cause the image classifier to misclassify the perturbed image. In other words, in the image space, the classes appear to intersect in the region of the adversarial examples—even if they are well-defined elsewhere.

SUMMARY

The present methods and apparatus interpreting decision making in recurrent neural networks and improving the robustness of decision making in recurrent neural networks. In brief, recurrent neural networks inherently exhibit temporal dynamic behavior. The activity in a recurrent neural network that is responsive to an input occurs over time. For example, the results of information processing can be fed back to nodes that have performed other processing operations. As another example, forward propagation through the network can include delays that coordinate the arrival of information.

Because of this temporal dynamic behavior, the response of a recurrent neural network to a given input can reflect prior input to the network. For example, a recurrent neural network that is quiescent may respond differently to a given input than it would if it were still responding to a previous input.

The present methods and apparatus exploit the temporal dynamic behavior of a recurrent neural network to provide improved information processing and a more robust output—and interpretation of that output. The temporal dynamic behavior of a recurrent neural network is interpreted as a process whereby relevant processing results are progressively reinforced or even amplified and irrelevant processing results are progressively attenuated or even discarded. The reinforcement and/or attenuation can reflect a decision being based on:
  a larger sample of an input that changes over time (such as, e.g., a longer sample of a video or an audio stream),
  repeated input of a non-changing input,
  different classes of input data (e.g., audio, video, image, physical parameters), and
  an ensemble of results from non-specialized or even universal processing activity in the recurrent neural network.

Implementation of such features within a recurrent neural network can help improve the robustness of decision making in the recurrent neural network—as well as the interpretation of the output of a recurrent neural network. Information processing in the recurrent neural network can be progressively reinforced over time. Reliance upon different classes of input data and longer durations of input data prevent noise, failure, or even adversarial perturbation of one class from unduly disturbing information processing by the network. Non-specialized processing activity allows context to be used in decision making.

In one aspect, methods, systems, and apparatus, including computer programs encoded on a computer storage medium, are described. For example, a method includes defining a plurality of different windows of time in a recurrent artificial neural network, wherein each of the different windows has different durations, has different start times, or has both different durations and different start times, identifying occurrences of topological patterns of activity in the recurrent artificial neural network in the different windows of time, comparing the occurrences of the topological patterns of activity in the different windows, and classifying, based on a result of the comparison, a first decision that is represented by a first topological pattern of activity that occurs in a first of the windows as less robust than a second decision that is represented by a second topological pattern of activity that occurs in a second of the windows.

In another aspect, methods, systems, and apparatus, including computer programs encoded on a computer storage medium, are described. For example, a method includes defining a first window of time and a second window of time in a recurrent artificial neural network, wherein the first window of time starts before the second window of time, identifying a topological pattern of activity in the recurrent artificial neural network that occurs in the first window of time but not in the second window of time, and adjusting one or more characteristics of the recurrent artificial neural network to attenuate or eliminate the occurrence of the topological pattern in the first window of time.

These and other aspects can include one or more of the following features. The first window can start before the second window. Data can be successively input into the recurrent artificial neural network and occurrences of the topological patterns can be successively identified in different windows of time that are defined relative to the successive inputs of the data. Each of the different windows of time can define a plurality of start times, defines a plurality of durations, or defines both a plurality of start times and a plurality of durations for the identification of topological patterns. Each of the different windows of time can define at least two durations, with a longer of the durations defined for identification of a more complex topological pattern of activity and a shorter of the durations defined for identification of a less complex topological pattern of activity. Each of the different windows of time can define at least two start times, with a sooner of the start times defined for identification of a topological pattern of activity in a region of the recurrent neural network that is primarily perturbed by a single class of input data and a later of the start times defined for identification of a topological pattern of activity in a region of the recurrent neural network that fuses classes of input data. One or more characteristics of the recurrent artificial neural network can be adjusted to attenuate or eliminate the first decision that is represented by a first topological pattern of activity that occurs in a first window. Occurrences of the topological patterns of activity can be compared by subtracting a first collection of binary digits from a second collection of binary digits, wherein each binary digit indicates whether a respective topological pattern occurred. Occurrences of topological patterns of activity can be identified by identifying occurrences of simplex patterns of activity. For example, the simplex patterns can enclose cavities. The topological pattern of activity can be identified by comparing a collection of topological patterns of activity that occur in the first window of time with a collection of topological patterns of activity that occur in the second window of time. Collections of the topological patterns of activity can be compared by subtracting a first collection of binary digits from a second collection of binary digits, wherein each binary digit indicates whether a respective topological pattern occurred. First data can be input into the recurrent artificial neural network at a time such that the recurrent artificial neural network is perturbed by the first data during the first window of time. Second data can be input into the recurrent artificial neural network at a time such that the recurrent artificial neural network is perturbed by the second data during the second window of time. The first data and the second data can be either first and second images that feature a same subject or first and second text snippets that share a textual characteristic. Each of the first window of time and the second window of time can define a longer duration for identification of a more complex topological pattern of activity and a shorter duration for identification of a less complex topological pattern of activity. The first window of time can be defined for identification of a topological pattern of activity in a region of the recurrent neural network that is primarily perturbed by a single class of input data. The second window of time can be defined for identification of a topological pattern of activity in a region of the recurrent neural network that that fuses classes of input data. Occurrences of topological patterns of activity can be identified by identifying occurrences of simplex patterns of activity. The simplex patterns can enclose cavities.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Recurrent artificial neural networks can be constructed to implement a variety of different connections that convey information across the network over time. The connections may feed information forward or backward within the network and can be implemented on a variety of different levels and time scales. For example, connections can be implemented on the level of a region or other collection or nodes that are primary perturbed by one type of input data. As another example, connections can be implemented between different regions that are primary perturbed by different types of input data. The time scales for information transmission under such diverse circumstances can also vary.

With this in mind, in some implementation, the response of a recurrent neural network to input can be viewed as a process of progressive certainty. An instantaneous perturbation that is responsive to one type of input data is not only fused or combined with perturbations that are responsive to other types of input data, but it is also fused or combined with perturbations that are responsive to same type of input data that occur at different times. The fusion or combination can progressively amplify relevant perturbations and/or progressively dampen irrelevant perturbations. Relevant subnetworks within the recurrent neural network can be activated. Even low-likelihood conclusions can be reached if enough input is received. Further, the conclusions are robust and insensitive to noise, fault, or even adversarial attack.

Figure 1:
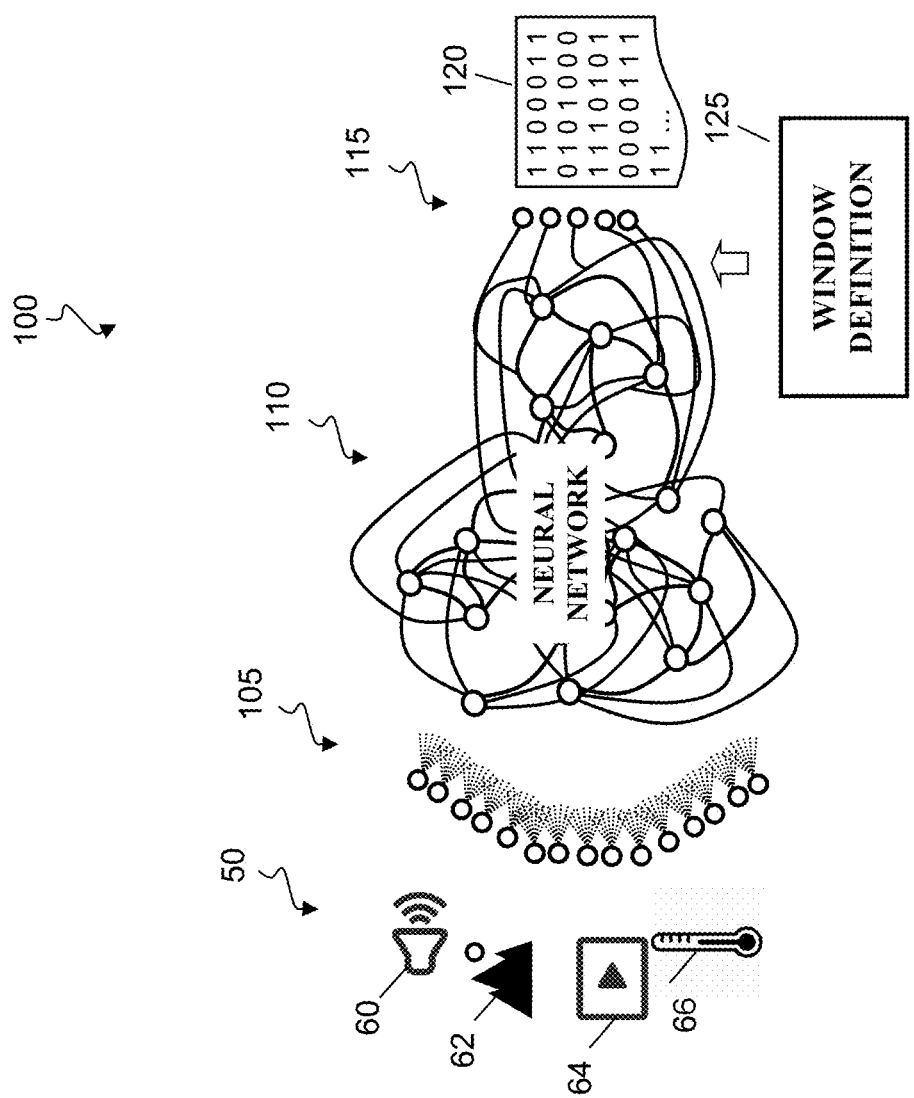
FIG. 1 is a schematic representation of an implementation of an artificial neural network system that abstracts and clusters data that originates from multiple, different sensors.

FIG. 1 is a schematic representation of an implementation of an artificial neural network system 100 that abstracts and clusters data 50 that originates from multiple, different sensors. Neural network system 100 includes a collection of inputs 105, a recurrent neural network 110, a collection of outputs 115, and a window definition unit 125. Window definition unit 130 can be used to determine that certain decisions are not as robust as others and, e.g., may be the result of noise, fault, or even adversarial attack. In some implementations, window definition unit 130 can be used to improve the robustness of recurrent neural network 110, as discussed further below.

Data 50

In some implementations, recurrent neural network 110 can be coupled to receive data 50 that originates from multiple, different sensors. The sensors can be, e.g., transducers that convert different physical properties into data or devices that sense only data, such as, e.g., a device that senses the content of a document or data stream. Data 50 may have different formats or other characteristics. For example, certain classes of data 50 (e.g., video or audio data) may change relatively rapidly in time, whereas other classes of data 50 (e.g., a still image or temperature) may change relatively slowly or not at all.

In the illustrated implementation, data 50 includes one or more of sound data 60 that originates from, e.g., a microphone, still image data 62 that originates from, e.g., a still camera, video data 64 that originates from, e.g., a video camera, and temperature data 66 that originates from, e.g., a temperature sensor. This is for illustrative purposes only. Data 50 need not include one or more of sound data 60, still image data 62, video data 64, temperature data 66. Also, data 50 can include one or more of a variety of other different types of data including, e.g., pressure data, chemical composition data, acceleration data, electrical data, position data, or the like. Data 50 that originates from a sensor can undergo one or more processing actions prior to input into neural network 110. Examples of such processing actions include, e.g., amplitude scaling, time coding, time or phase shifting, and/or non-linear processing in an artificial neural network device.

In other implementations, only a single type of input data is received.

Network Inputs 105

In the illustrated implementation, inputs 105 are schematically represented as a well-defined input layer of nodes that each passively relay the input to one or more locations in neural network 110. However, this is not necessarily the case. For example, in some implementations, one or more of inputs 105 can scale, delay, phase shift or otherwise process some portion or all of the input data before data is conveyed to neural network 110. As another example, data may be injected into different layers and/or edges or nodes throughout neural network 110, i.e., without a formal input layer as such. For example, a user can specify that data is to be injected into specific nodes or links that are distributed throughout network 110. As another example, neural network 110 need not be constrained to receiving input in a known, previously defined manner (e.g., always injecting a first bit into a first node, the second bit into a second node, . . . etc.). Instead, a user can specify that certain bits in the data are to be injected into edges rather than nodes, that the order of injection need not follow the order that the bits appear, or combinations of these and other parameters. Nevertheless, for the sake of convenience, the representation of inputs 105 as an input layer will be maintained herein.

Recurrent Neural Network 110

In recurrent neural networks, the connections between nodes form a directed graph along a temporal sequence and the network exhibits temporal dynamic behavior. In some implementations, recurrent neural network 110 is a relatively complex neural network that is modelled on a biological system. In other words, recurrent neural network 110 can itself model a degree of the morphological, chemical, and other characteristics of a biological system. In general, recurrent neural networks 110 that are modelled on biological systems are implemented on one or more computing devices with a relatively high level of computational performance.

In contrast with, e.g., traditional feedforward neural networks, recurrent neural networks 110 that are modelled on biological systems may display background or other activity that is not responsive to input data. Indeed, activity may be present in such neural networks 110 even in the absence of input data. However, upon input of data, a recurrent neural network 110 will be perturbed. Since the response of such a neural network 110 to a perturbation may depend, in part, on the state of neural network 110 at the time that data is input, the response of such a neural network 110 to the input of data may also depend on the background or other activity that is already present in neural network 110. Nevertheless, even though such activity in a neural network is not responsive only to the input of data, it is responsive to input data.

The response of neural network 110 to the input data can be read as a collection of topological patterns. In particular, upon the input of data, neural network 110 will respond with a certain activity. That activity will include:

activity that does not comport with defined topological patterns, and activity that does comport with defined topological patterns.

The activity in neural network 110 that does not comport with defined topological patterns can in some cases be incorrect or incomplete abstractions of the characteristics of the input data, or other operations on the input data. The activity in neural network 110 that does comport with topological patterns can abstract different characteristics of the input data. Each of the abstracted characteristics may be more or less useful depending on the application. By limiting representation 120 to representation of certain topological patterns, both incorrect or incomplete abstractions and abstraction of characteristics that are not relevant to a particular application can be "filtered out" and excluded from representation 120.

At times, neural network 110 will respond to the input of data that originates from different sensors with one or more topological patterns that are the same, even if other topological patterns are different. For example, neural network 110 may respond to either a temperature reading or a still image of a desert with a topological pattern that represents a qualitative assessment of "hot," even if other topological patterns are also part of the response to each input. Similarly, neural network 110 can respond to the conclusion of a musical composition or a still image of a plate with crumbs with a topological pattern that represents a qualitative assessment of "done," even if other topological patterns are also part of the response to each input. Thus, at times, the same characteristic may be abstracted from data that has different origins and different formats.

At times, neural network 110 will respond to the input of data that originates from different sensors with one or more topological patterns that represent the synthesis or fusion of the characteristics of the data from those sensors. In other words, a single such pattern can represent an abstraction of the same characteristic that is present in different types of data. In general, the fusion or synthesis of data from different sensors will act to cause such patterns to arise or the strength of the activity of such patterns to increase. In other words, data from different sensors can act as "corroborative evidence" that the same characteristic is present in the diverse input data.

In some cases, topological patterns that represent the synthesis or fusion of the characteristics of data from different sensors will only arise if certain characteristics are present in the data from different sensors. Neural network 110 can in effect act as an AND gate and require that certain characteristics in data from different sensors in order for certain patterns of activity to arise. However, this need not be the case. Instead, the magnitude of the activity that forms a pattern may increase or the timing of the activity may shorten in response to data from different sensors. In effect, the topological patterns of activity—and their representation in representation 120—represent abstractions of the characteristics of the input data in a very rich state space. In other words, the topological patterns of activity and their representation are not necessarily the predefined "results" of processing input data in the sense that, e.g., a yes/no classification is the predefined result yielded by a classifier, a set of related inputs is the predefined result yielded by a clustering device, or a prediction is the predefined result yielded by a forecasting model. Rather, the topological patterns are abstractions of the characteristics of the input data. Although that state space may at times include abstractions such as a yes/no classification, the state space is not limited to only those predefined results.

Further, the topological patterns may abstract characteristics of only a portion (e.g., a particular region of an image or a particular moment in a video or audio stream or a particular detail of the input such as a pixel) of the input data, rather than the entirety of the input data. Thus, the state space of the abstractions is neither limited to either a predefined type of result (e.g., a classification, a cluster, or a forecast), nor to abstractions of the entirety of the input data. Rather, the topological patterns are a tool that allows the processing by a high-dimensional, non-linear, recurrent dynamic system (i.e., neural network 110) to be read. The topological patterns extract correlates of the input data that arise in neural network 110, including correlates that fuse the data into a more complete "whole." Further, by virtue of the recurrent nature of the neural network, the fusion occurs over time. As initial operations or abstractions are completed, the results of these initial operations or abstractions can be fused with other operations or abstractions that are completed at the same time or even later. The fusion thus occurs at a different, later time than the initial operations or abstractions.

Notwithstanding the different origins and formats, neural network 110 can still abstract characteristics from the data. For example, neural network 110 may abstract:
  physical traits (e.g., color, shape, orientation, speed),
  categories (e.g., car, cat, dog), and/or
  abstract qualitative traits (e.g., "alive" vs. "dead," "smooth" vs. "rough," "animate" vs. "inanimate," "hot" vs. "cold," "open" vs. "closed").

If one were to constrain input data to originating from a small number of sensors, it may be unlikely that neural network 110 would abstract the data from that sensor in certain ways. By way of example, it may be unlikely that neural network 110 would abstract temperature data by itself into a pattern of activity that corresponds to a spatial trait like shape or orientation. However, as data from different sensors is input into neural network 110, the perturbations provoked by diverse input data meet each other and can collectively influence the activity in neural network 110. As a result, the neural network 110 may abstract input data into different or more certain patterns of activity.

For example, there may be a degree of uncertainty associated with the presence or absence of a pattern. If the input data includes data from diverse range of sensors, both the diversity of the patterns and the certainty of the patterns may increase as the data that originates from different sensors is synthesized or fused within the neural network 110. By way of analogy, a passenger who is sitting in a train at a train station may look out the window and see an adjacent train that appears to be moving. That same passenger may also, e.g., feel forward pressure from the seat. The fusion or synthesis of this information increases the passenger's degree of certainty that the passenger's train is moving, rather than the adjacent train. When neural network receives diverse input data, the perturbations provoked by that data can collectively be abstracted into different or more certain patterns of activity.

The ability of recurrent neural network 110 to process input data from diverse sensors also provides a degree of robustness to the abstraction of that data. By way of example, one sensor of a group may become inaccurate or even inoperative and yet neural network 110 can continue to abstract data from the other sensors. Often, recurrent neural network 110 will abstract data from the other sensors into the same patterns of activity that would have arisen had all of the sensors been functioning as designed. However, in some instances, the certainty of those abstractions may decrease. Nevertheless, abstraction can continue even if such a problem should arise.

Moreover, there are several characteristics of links and nodes that form recurrent neural network 110 that can improve the robustness of a recurrent neural network. One example characteristic is a relatively large fan-out and/or large fan-in of the links that are connected to nodes. In this context, fan-out is the number of nodes or links that receive input from a single output of a node or link. Fan-in is the number of inputs that a node or link receives. The large fan-in and fan-out are schematically illustrated by the dashed-line links discussed above.

In some implementations, a single node may output signals to between 10 and $10^6$ other nodes, for example, between $10^3$ and $10^5$ other nodes. In some implementations, a single node may receive signals from between 10 and $10^6$ other nodes, for example, between $10^3$ and $10^5$ other nodes. Such a relatively large fan-out leads to a very dramatic distribution of the results of processing by each node. Further, such a relatively large fan-in allows each node to based processing on input that originates from a legion of different nodes. Any particular fault—be it in the input data or the nodes and links within the recurrent neural network itself is unlikely to lead to catastrophic failure.

Another example characteristic that can improve the robustness of a recurrent neural network is the non-linear transmission of information within the neural network. For example, the links in recurrent neural network 110 can be spike-like transmissions that carry information, e.g., based on the number of spikes within a given time. As another example, the nodes and links in recurrent neural network 110 can have non-linear activation functions, including activation functions that resemble the activation functions of biological neurons.

Another example characteristic that can improve the robustness of a recurrent neural network are multi-link connections between individual nodes. In some cases, such multiple links may be purely redundant and convey the exact same information between the connected nodes in the exact same manner. However, in general, multiple links will not convey the exact same information in the exact same manner. For example, different processing results may be conveyed by different links. As another example, the multiple links may convey the same result such that the result arrives at the destination node at different times and/or with different consequences at the receiving node.

In some implementations, the links in a recurrent neural network can be either inhibitory or excitatory. Inhibitory links make it less likely that the receiving node outputs a particular signal whereas excitatory links make it more likely that the receiving node outputs a particular signal. In some implementations, nodes may be connected by multiple excitatory links (e.g., between 2 and 20 links or between 3 and 10 links). In some implementations, nodes may be connected by multiple inhibitory links (e.g., between 5 and 40 links or between 10 and 30 links).

Multi-link connections both provide a robust connectivity amongst the nodes and help avoid fully deterministic processing. As discussed further below, another characteristic that can contribute to robustness is non-deterministic transmission of information between nodes. Any particular fault—be it in the input data or the nodes and links within the recurrent neural network itself—is unlikely to lead to catastrophic failure because of the distributed transmission of non-deterministic information through multi-link connections.

Another example characteristic that can improve the robustness of a recurrent neural network is non-deterministic transmission between individual nodes. A deterministic system is a system that develops future states without randomness. For a given input, a deterministic system will always produce the same output. In the present context, non-deterministic transmission between nodes allows a degree of randomness in the signal that is transmitted to another node (or even output from the recurrent neural network) for a given set input data. The input data is not merely the data that is input to the recurrent neural network as a whole, but also encompasses the signals received by individual nodes within the recurrent neural network.

Such randomness can be introduced into the signal transmission in a variety of ways. For example, in some implementations, the behavior of nodes can be non-deterministic. Decision thresholds, time constants, and other parameters can be randomly varied to ensure that a given node does not respond identically to the same input signals at all times. As another example, the links themselves can be non-deterministic. For example, transmission times and amplitude attenuations can be randomly varied to ensure that a given link does not convey the same input signal identically at all times.

As yet another example, the behavior of the recurrent neural network as a whole can be non-deterministic and this behavior can impact the transmission of signals between nodes. For example, the recurrent neural network may display background or other activity that is not dependent on the input data, e.g., present even in the absence of input data. Such a background level of activity may lead to non-deterministic transmission between individual nodes even if the nodes and the links are themselves deterministically defined.

By introducing a degree of variability into the signal transmission, the processing within the recurrent neural network will inherently be tolerant of minor deviations. In particular, a recurrent neural network that can produce meaningful results notwithstanding a certain amount of variability in the signal transmission within the recurrent neural network will also be able to produce meaningful results if there is a fault—either in the input data or the nodes and links within the recurrent neural network itself. The performance of the recurrent neural network will degrade gracefully rather than catastrophically.

For the sake of completeness, a single recurrent neural network 110 need not possess all of these characteristic simultaneously in order to have an improved robustness. Rather, a combination of these characteristics or even individual one of such characteristics can improve robustness to some extent.

Network Outputs 115 and Representation 120

The abstraction of data by neural network 110 can be read from outputs 115 as, e.g., a collection of (generally binary) digits that each represent the presence or absence of a respective topological pattern of activity in neural network 110 responsive to input data. In some case, each digit in representation 120 represents the presence or absence of a respective pattern of activity in neural network 110. Representation 120 is only schematically illustrated and representation 120 can be, e.g., one-dimensional vector of digits, a two-dimensional matrix of digits, or other collection of digits. In general, the digits in representation 120 will be binary and indicate in a yes/no manner whether a pattern of activity is present or not. However, this is not necessarily the case. Instead, in some implementations, the digits in representation 120 will be multi-valued. The values can denote characteristics of the presence or absence of a respective pattern of activity in neural network 110. For example, the values can indicate the strength of the activity or a statistical probability that a specific pattern of activity is in fact present. By way of example, activity that is relatively large in magnitude or that occurs within a relatively short window of time can be considered as indicating that a specific decision has been reached or was likely to have been reached. In contrast, activity that is relatively small in magnitude or that occurs over a relatively longer time can be considered less likely to indicate that a specific decision has been reached.

In any case, the responsive patterns of activity represent a specific operation performed by the neural network 110 on the input data. The operation can be arbitrarily complex. A single digit can thus encode an arbitrarily complex operation and a set of digits can convey a set of operations, each with an arbitrary level of complexity.

Further, the topological patterns of activity—and their representation in representation 120—can be "universal" in the sense that they are not dependent on the origin of the data being input into the neural network nor on the application to which representation 129 is applied. Rather, the topological patterns of activity express abstract characteristics of the data that is being input into neural network 110—regardless of the origins of that data.

Typically, multiple topological patterns of activity will arise in response to a single input, whether the input is discrete (e.g., a still photo or a single reading from a transducer that measures a physical parameter) or continuous (e.g., a video or an audio stream). The output representation 120 can thus represent the presence or absence topological structures that arise in the patterns of activity responsive to the input data even in a relatively complex recurrent neural network that is modelled on biological systems.

In the illustrated implementation, outputs 115 are schematically represented as a multi-node output layer. However, outputs 115 need not be a multi-node output layer. For example, output nodes 115 can be individual "reader nodes" that identify occurrences of a particular pattern of activity at a particular collection of nodes in neural network 110 and hence read the output of neural network 110. The reader nodes can fire if and only if the activity at a particular collection of nodes satisfies timing (and possibly magnitude or other) criteria. For example, output nodes 115 can be connected to a collection of nodes in neural network 110 and indicate the presence or absence topological structures based on, e.g., the activity levels of each individual node crossing a respective threshold activation level, a weighted sum of the activity levels of those nodes crossing a threshold activation level, or a non-linear combination of the activity levels of those nodes crossing a threshold activation level.

The information in representation 120 is holographically represented in the sense that information about the value of a single digit is distributed across the values of other digits in the representation 120. In other words, random subsets of digits in representation 120 also contain information about the operations performed by the neural network 110 to input, just at lower resolution than would be present if all the digits in representation 120 were present. As discussed further below, different topological patterns have different degrees of complexity. Some relatively more complex patterns may include relatively less complex patterns. Further, simple patterns can be assembled to more complex patterns. Moreover, relatively high levels of abstraction that are represented by some digits may be correlated to some extent with other abstractions represented by other digits. For example, a digit that represents the occurrence of an abstract qualitative trait like "alive" may be correlated with a digit that represents a qualitative trait like "animate." Information about the occurrence of some topological patterns thus inherently includes some information about the occurrence of other topological patterns.

For the sake of convenience, the remainder of the application will refer to the representation 120 as a collection of binary bits and the FIGS. will illustrate them as such. However, it is to be understood that in all cases the digits of representation 120 can also be multi-valued to encode various aspects of the operations performed by the network.

Window Definition Unit 125

As discussed above, the response of a recurrent neural network to input can be viewed as a process of progressive certainty in which the perturbations responsive to the instantaneous input is combined or fused with perturbations that are responsive to previous input. The perturbations give rise to topological patterns of activity that are represented by the digits in representation 120.

Window definition unit 125 is a device that is configured to define different windows of time for the detection of topological patterns of activity and the corresponding representation in representation 120. In general, window definition unit 125 can define both the duration of the windows and the timing of the windows.

As an aside, in artificial recurrent neural network devices, time is artificial and represented using mathematical constructs. For example, rather than requiring a real world passage of time for signals to transmit from node to node, such signals can be represented in terms of artificial units that are generally unrelated to the real world passage of time—as measured in computer clock cycles or otherwise. Nevertheless, the state of an artificial recurrent neural network device can be described as "dynamic" in that it changes with respect to these artificial units. For the sake of convenience, these artificial units are referred to herein as "time." Nevertheless, it is to be understood that these units are artificial—even when they are scaled to real-world time in recurrent neural networks that are closely modelled on biological systems—and generally do not correspond to the real world passage of time.

Further, as used herein, a "window" for the detection of topological patterns of activity need not be constrained to a single duration of the time. As discussed further below, there are various factors that can influence the timing of topological patterns of activity in a recurrent neural network. These factors include, e.g., the complexity of the topological patterns and the regions in which topological patterns of activity are identified. With such factors in mind, a single "window" can be defined to have different durations and/or different start times for the identification of different patterns. By way of example, a single "window" can be defined to have relatively short durations for the identification of relatively simple topological patterns of activity but relatively longer durations for the identification of relatively complex topological patterns of activity. The durations can be defined based on factors such as, e.g., transmission delays, response times, and decay times associated with various parameters in the recurrent neural network. As another example, a single "window" can be defined to have a variety of different start times for identification of different patterns of activity in different regions of a neural network. For example, the start time(s) of a single window for a region that is primarily perturbed by only a single class of input data can be prior to the start time(s) of that same single window for a region that fuses multiple classes of input data. Once again, the start times can be defined based on factors such as, e.g., transmission delays, response times, and decay times associated with various parameters in the recurrent neural network.

Returning to window definition unit 125, the different windows of time can be tailored to achieve a number of different objectives. For example:

Inter-pattern Window Definition: As discussed further below, different topological patterns of activity can have different complexities. In some implementations, window definition unit 125 can define different duration windows to accommodate the different complexities of different patterns. For example, when activity that comports with relatively complex topological patterns is to be identified, window definition unit 125 can define longer duration windows than when activity that comports with relatively simple topological patterns is to be identified.

Window Definition for Response to Input Duration: Some types of input inherently occur over relatively long durations (e.g., a video or an audio stream), whereas other types of input inherently occur over relatively short durations (e.g., a still image or a single data point). The topological patterns of activity that arise in response to different inputs can be scaled and shifted in time according to the duration of the input and the timing of the occurrence of the input. In some implementations, when activity that is responsive to relatively longer duration input is to be identified, window definition unit 125 can define longer duration windows and/or windows that occur later in time than when activity that is responsive to relatively shorter duration input is to be identified.

Figure 5:
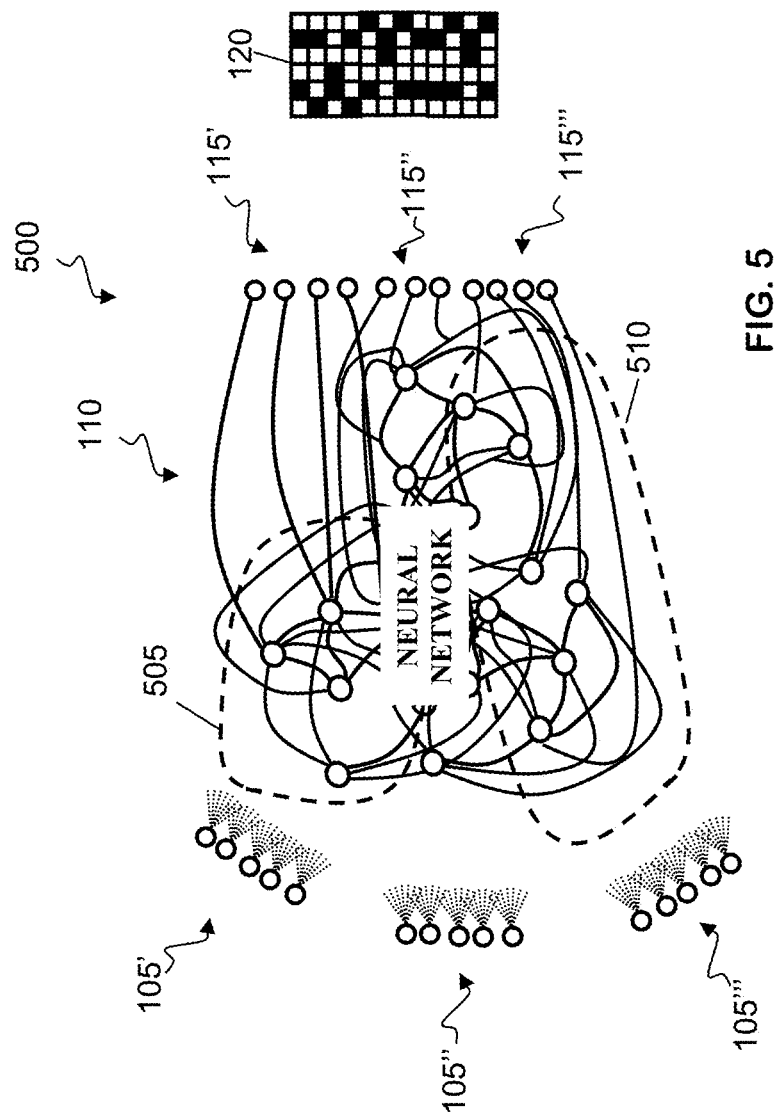
FIG. 5 is a schematic representation of an approach for inputting data that originates from different sensors into neural network.

Window Definition for Capturing Abstractions of Fused Input: In some implementations, abstractions of input data that originates from different sensors can be made later in time and over relatively longer durations than abstractions of input data that originate from different sensors. For example, as illustrated in FIG. 5 below, different regions of a recurrent neural network may be primarily perturbed by a single class of input data. Decisions and abstractions that fuse different classes of input data may occur later in time and require relatively longer durations than decisions and abstractions that are based on a single class of input data. When activity that is responsive to data that originates from different sensors is to be identified, window definition unit 125 can define longer duration windows and/or windows that occur later in time than when activity that is responsive to a single sensor is to be identified.

Window Definition for Measuring Certainty: In some implementations, windows can be defined to monitor changes in the certainty of decisions. In particular, initial abstractions of input data may be incomplete and/or inaccurate. Since a recurrent neural network processes information over time, with feedback loops and long-lived changes in the states of nodes and/or links, relevant processing results can be progressively reinforced or even amplified and irrelevant processing results can be progressively attenuated or even discarded. When activity that represents higher certainty results is to be identified, window definition unit 125 can define longer duration windows and/or windows that occur later in time than when activity that is less certain is to be identified.

Window Definition for Identifying Adversarial Attack: In some implementations, windows can be defined to identify an adversarial attack on the network. Image classifiers and other neural networks can be sensitive to small, non-random perturbations of the input data. The impact of such small, non-random perturbations is greatest on short times scales, i.e., before relevant processing results can be progressively reinforced, before irrelevant processing results can be progressively attenuated, before input that occur over relatively long durations has been input in its entirety, and/or before input data that originates from different sensors can be fused. When activity that arises soon after input or on short duration time scales is identified, window definition unit 125 can facilitate identification of (attempted) adversarial attacks on the recurrent neural network.

Figure 2:
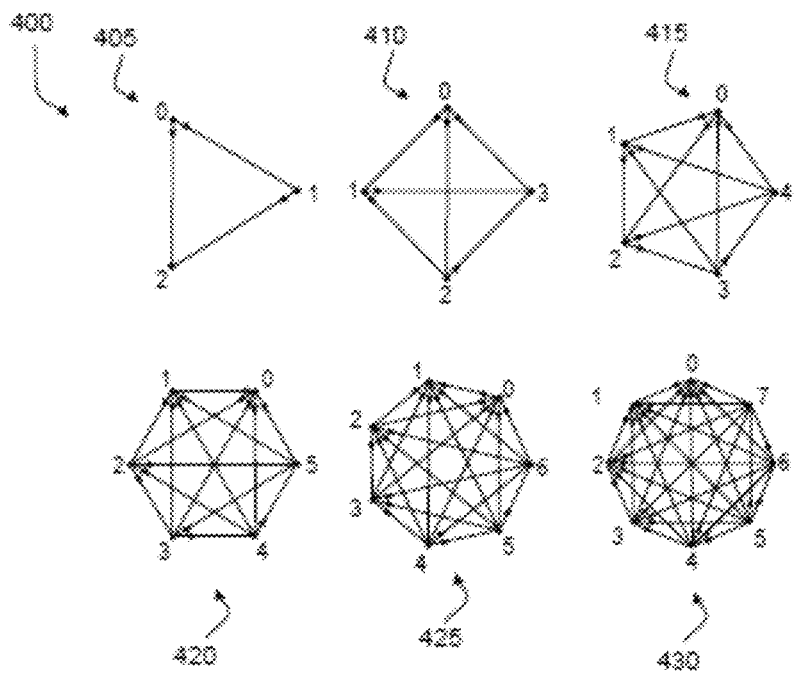
FIGS. 2 and 3 are representations of patterns of activity that can be identified and "read" to generate a collection of digits from neural network.

FIG. 2 is a representation of patterns 400 of activity that can be identified and "read" to generate collection 120 from neural network 110 (FIG. 1).

Patterns 400 are representations of activity within a recurrent artificial neural network. To read patterns 400, a functional graph is treated as a topological space with nodes as points. Activity in nodes and links that comports with patterns 400 can be recognized as ordered regardless of the identity of the particular nodes and/or links that participate in the activity. In the illustrated implementation, patterns 400 are all directed cliques or directed simplices. In such patterns, activity originates from a source node that transmits signals to every other node in the pattern. In patterns 400, such source nodes are designated as point 0 whereas the other nodes are designated as points 1, 2, . . . . Further, in directed cliques or simplices, one of the nodes acts a sink and receives signals transmitted from every other node in the pattern. In patterns 400, such sink nodes are designated as the highest numbered point in the pattern. For example, in pattern 405, the sink node is designated as point 2. In pattern 410, the sink node is designated as point 3. In pattern 415, the sink node is designated as point 3, and so on. The activity represented by patterns 400 is thus ordered in a distinguishable manner.

Each of patterns 400 has a different number of points and reflects ordered activity in a different number of nodes. For example, pattern 405 is a 2D-simplex and reflects activity in three nodes, pattern 410 is a 3D-simplex and reflects activity in four nodes, and so on. As the number of points in a pattern increases, so does the degree of ordering and the complexity of the activity. For example, for a large collection of nodes that have a certain level of random activity within a window, some of that activity may comport with pattern 405 out of happenstance. However, it is progressively more unlikely that random activity will comport with the respective of patterns 410, 415, 420 . . . . The presence of activity that comports with pattern 430 is thus indicative of a relatively higher degree of ordering and complexity in the activity that the presence of activity that comports with pattern 405.

Different duration windows can be defined for different determinations of the complexity of activity. For example, when activity that comports with pattern 430 is to be identified, longer duration windows can be used than when activity that comports with pattern 405 is to be identified.

Figure 3:
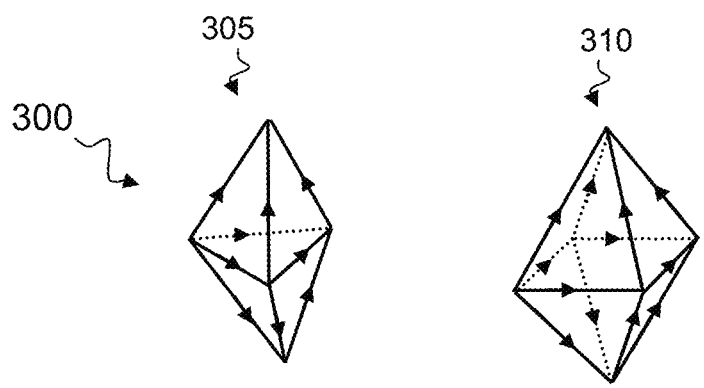

FIG. 3 is a representation of patterns 300 of activity that can be identified and "read" to generate binary digit collection 120 from neural network 110 (FIG. 1).

Patterns 300 are groups of directed cliques or directed simplices of the same dimension (i.e., have the same number of points) that define patterns involving more points than the individual cliques or simplices and enclose cavities within the group of directed simplices.

By way of example, pattern 305 includes six different three point, 2-dimensions patterns 405 that together define a homology class of degree two, whereas pattern 310 includes eight different three point, 2-dimensions patterns 405 that together define a second homology class of degree two. Each of the three point, 2-dimensions patterns 405 in patterns 305, 310 can be thought of as enclosing a respective cavity. The nth Betti number associated with a directed graph provides a count of such homology classes within a topological representation.

The activity represented by patterns such as patterns 300 represents a relatively high degree of ordering of the activity within a network that is unlikely to arise by random happenstance. Patterns 300 can be used to characterize the complexity of that activity.

In some implementations, only some patterns of activity are identified and/or some portion of the patterns of activity that are identified are discarded or otherwise ignored. For example, with reference to FIG. 2, activity that comports with the five point, 4-dimensional simplex pattern 415 inherently includes activity that comports with the four point, 3-dimensional and three point, 2-dimension simplex patterns 410, 405. For example, points 0, 2, 3, 4 and points 1, 2, 3, 4 in 4-dimensional simplex pattern 415 of FIG. 2 both comport with 3-dimensional simplex pattern 410. In some implementations, patterns that include fewer points—and hence are of a lower dimension—can be discarded or otherwise ignored. As another example, only some patterns of activity need be identified. For example, in some implementations only patterns with odd number of points (3, 5, 7, . . . ) or even numbers of dimensions (2, 4, 6, . . . ) are identified. Notwithstanding the identification of only some patterns, information about the activity in the neural network can nevertheless be holographically represented, i.e., at lower resolution that if all patterns of identified and/or represented in an output.

As discussed above, the patterns of activity that are responsive to input data 50 represent a specific operation of arbitrary complexity performed by the neural network 110 on that input data 50. In some implementations, the complexity of the operation will be reflected in the complexity of the topological pattern. For example, the operation or abstraction represented by the five point, 4-dimensional simplex pattern 415 may be more complex than the operations or abstractions represented by the four point, 3-dimensional and three point, 2-dimension simplex patterns 410, 405. In such cases, digits that represent the presence of activity convey that a set operations or abstractions is performed in neural network 110, where each of these operations or abstractions has an arbitrary level of complexity.

Figure 4:
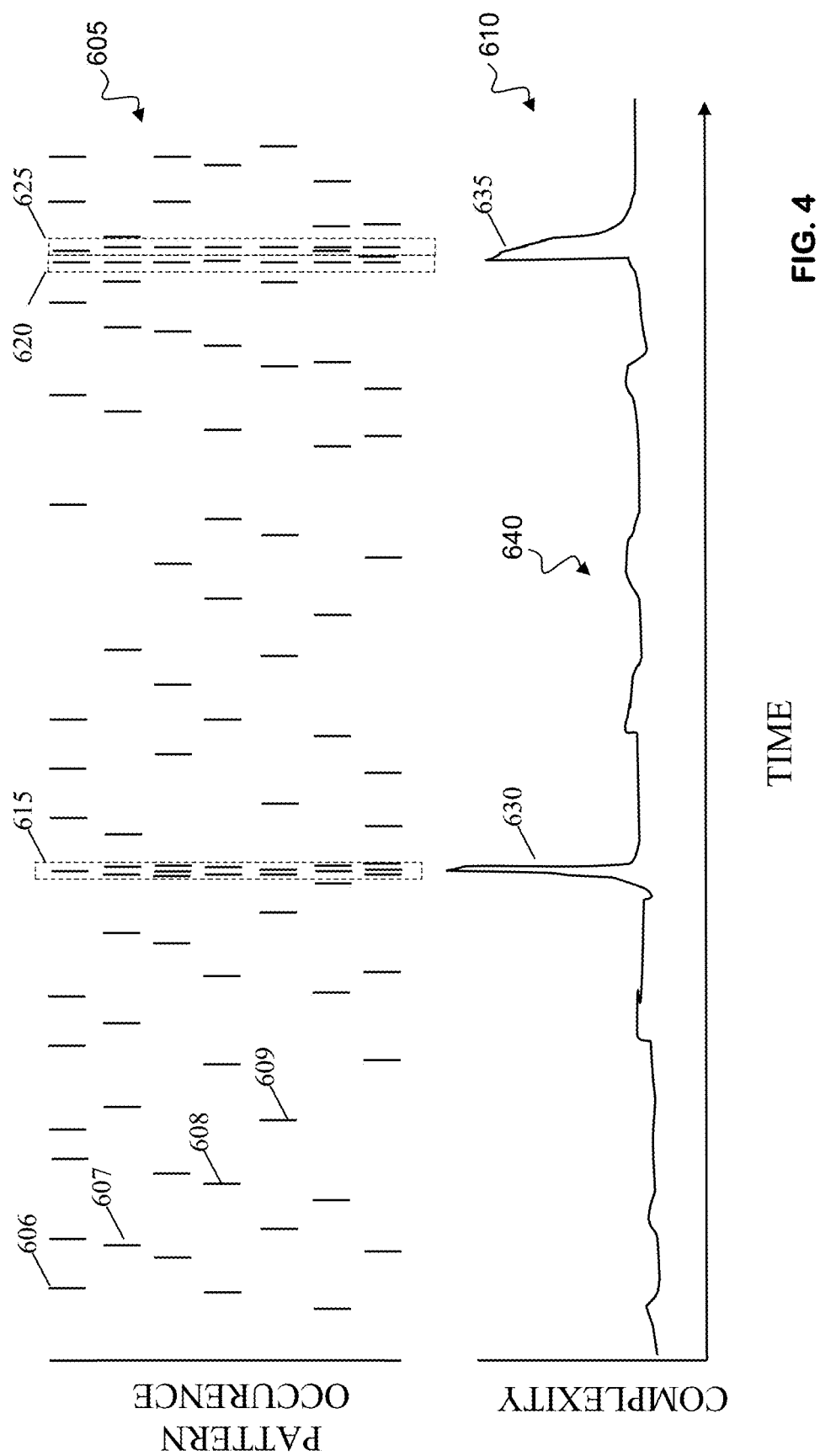
FIG. 4 is a graph that represents occurrences of patterns as a function of time.

FIG. 4 is a schematic representation of a determination of the timing of activity patterns that have a distinguishable complexity. The determination represented in FIG. 4 can be performed as part of an identification or "reading" of patterns of activity to generate binary digit collection 120 from neural network 110 (FIG. 1).

FIG. 4 includes a graph 605 and a graph 610. Graph 605 represents occurrences of patterns as a function of time along the x-axis. In particular, individual occurrences are represented schematically as vertical lines 606, 607, 608, 609. Each row of occurrences can be instances where activity matches a respective pattern or class of pattern. For example, the top row of occurrences can be instances where activity matches pattern 405 (FIG. 2), the second row of occurrences can be instances where activity matches pattern 410 (FIG. 2), the third row of occurrences can be instances where activity matches pattern 415 (FIG. 2), and so on.

Graph 605 also includes dashed rectangles 615, 620, 625 that schematically delineate different windows of time when the activity patterns have a distinguishable complexity. As shown, the likelihood that activity in the recurrent artificial neural network matches a pattern indicative of complexity is higher during the windows delineated by dashed rectangles 615, 620, 625 than outside those windows.

Graph 610 represents the complexity associated with these occurrences as a function of time along the x-axis. Graph 610 includes a first peak 630 in complexity that coincides with the window delineated by dashed rectangle 615 and a second peak 635 in complexity that coincides with the window delineated by dashed rectangles 620, 625. As shown, the complexity represented by peaks 630, 635 is distinguishable from what can be considered to be a baseline level 640 of complexity.

In some implementations, the times at which the output of a recurrent artificial neural network is to be read coincide with the occurrences of activity patterns that have a distinguishable complexity. For example, in the illustrative context of FIG. 4, the output of a recurrent artificial neural network can be read at peaks 630, 635, i.e., during the windows delineated by dashed rectangles 615, 620, 625.

In some implementations, not only the content but also the timing of the activity patterns that have a distinguishable complexity can be output from the recurrent artificial neural network. In particular, not only the identity and activity of the nodes that participate in activity that comports with the activity patterns, but also the timing of the activity patterns can be considered the output of the recurrent artificial neural network. The identified activity patterns as well as the timing when this decision is to be read can thus represent the result of processing by the neural network.

FIG. 5 is a schematic representation of an approach for inputting data 50 that originates from different sensors into neural network 110. In the illustrated implementation, different subsets 105', 105", 105''' of network inputs 105 are dedicated to receiving different types of input data. For example, a first subset 105' can be dedicated to receiving a first class of input data (e.g., data that originates from a first sensor) whereas a second subset 105" can be dedicated to receiving a second class of input data (e.g., data that originates from a second sensor).

In some implementations, corresponding "regions" 505, 510 of neural network 110 receive different classes of input data from different subsets 105', 105", 105''' of network inputs 105. For example, in the schematic illustration, regions 505, 510 are shown spatially discrete collections of nodes and edges with relatively few node-to-node connections between each region. This is not necessarily the case. Rather, the nodes and edges of each region 505, 510 can be spatially distributed within neural network 110 but yet receive a particular class of input data.

Regardless the distribution of the nodes in each region 505, 510, the processing in each region 505, 510 is primarily—but not necessarily exclusively—perturbed by the respectively received class of input data. The extent of perturbation can be measured based on the activity that occurs in a region with and without the respective class of input data being present. For example, a region that is primarily perturbed by a first class of input data may respond to the first class of input data in generally the same manner regardless of whether other classes of input data perturb network 110 at the same time. The processing and abstractions performed by each region 505, 510 are primarily influenced by the received class of input data. Nevertheless, the topological patterns of activity that arise in each region 505, 510 can be read as a digit collection 120. The same is true for other regions of recurrent neural network 110.

This schematically represented in neural network system 500 by separately designating different subsets 115', 115", 115''' of network outputs 115. In particular, subset 115' can be dedicated to outputting digits that represent topological patterns of activity that arise in region 505 of neural network 110, whereas subset 115''' can be dedicated to outputting digits that represent topological patterns of activity that arise in region 5100 of neural network 110. However, subset 115" outputs digits that are not found in either of regions 505, 510. Indeed, the digits that are output in subset 115" may represent a fusion or further abstraction of the abstract representations and processing results that arise in regions 505, 510 to a higher level of complexity.

For example, a given digit in subset 115" may arise if and only if both one or more digits in subset 115' and one or more digit in subset 115" have certain values. The digit in subset 115" can thus represent an arbitrarily higher level abstraction-both of the abstractions generated in regions 505, 510 but also of the input data itself. When different regions are primarily perturbed by a single class of input data, the processing in those regions can be tailored to the nature of the input data. For example, the depth of connection and the topology of network loops can be tailored to the input data. In recurrent neural networks that are modelled on biological systems, neuronal dynamics and synaptic plasticity can also be tailored to the input data. The tailoring, e.g., capture different time scales. For example, the processing in a region that is tailored to processing classes of input data that changes relatively rapidly (e.g., video or audio data) can be faster than the processing in a region that is tailored to processing classes of input data that changes relatively slowly or not at all.

Further, when different regions of a recurrent neural network are primarily perturbed by a single class of input data, it is easier for humans to attribute the representations that arise in a recurrent neural network to particular input data. The representations that arise in a particular region can be attributed to the class of input data that primarily perturbs that region. Once the representations that arise in a particular region are attributed, higher level and more complex abstractions that arise in response to the representations in a particular region can also be more easily understood.

Also, training can be targeted to portions of a recurrent neural network that are not primarily perturbed by a single class of input data, i.e., targeted to the portions of a recurrent neural network that fuse the processing results of regions that are primarily perturbed by a single class of input data. In effect, the regions that are primarily perturbed by a single class of input data will generate representations of the input data that are universal—not only for output from the recurrent neural network but also for further abstraction and other operations with the recurrent neural network.

Figure 6:
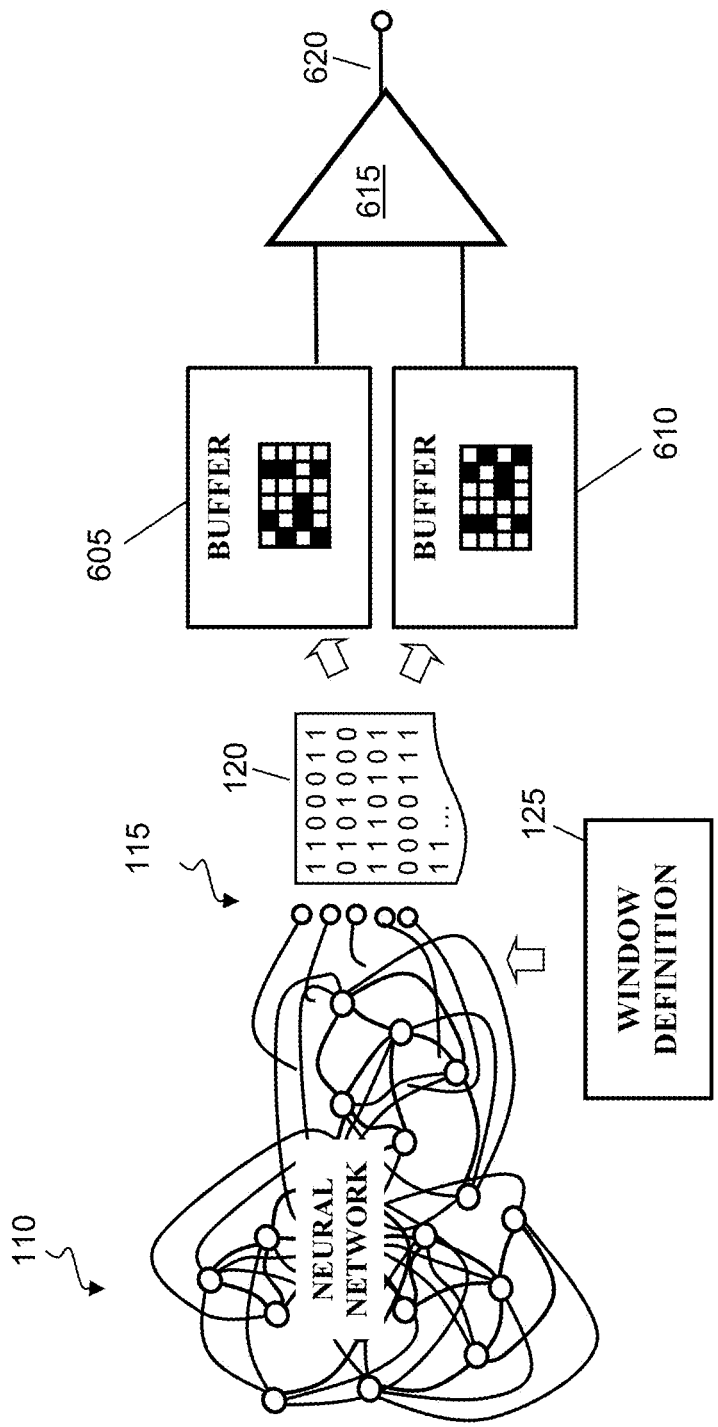
FIG. 6 is a schematic representation of how the windows that are defined by window definition unit can be used in various contexts.

FIG. 6 is a schematic representation of how the windows that are defined by window definition unit 125 can be used in various contexts, such as identifying activity that is responsive to input of different durations, capturing abstractions of fused input, measuring certainty, and identifying adversarial attack. The illustrated implementation of system 100 includes a plurality of data buffers 605, 610 and a comparator 615. Data buffers 605, 610 can be implemented as any of a number of different data storage devices. Comparator 615 is a device that is configured to compare a collection of binary or other digits and/or determine a difference therebetween. Comparator 615 can be implemented as hardware and/or software. Although only two data buffers 605, 610 are illustrated, more than two data buffers can be used in some contexts.

In operation, window definition unit 125 defines the duration and/or the timing of different windows for output of different representations 120 of topological patterns. The different representations 120 can represent topological patterns that occur, e.g., within windows that have a same duration but occur at different times, windows that have occur at overlapping times but have different durations, or windows that have occur at different times and different durations. Data buffer 605 is coupled to store a first set of representations 120 of topological patterns. Data buffer 610 is coupled to store a second set of representations 120 of topological patterns. In the illustrated implementation, the stored representations 120 are schematically illustrated as a two-dimensional matrix of binary digits. In other implementations, representations 120 can be stored, e.g., as one-dimensional vectors and/or as multi-valued digits.

Comparator 615 is coupled to receive the sets of representations 120 that are stored in data buffers 605, 610, compare them, and output the results of the comparison. The comparison can take a number of different forms depending on the application context. The result of the comparison can also take multiple forms, but in general will be a collection of digits that represent topological patterns that satisfy certain criteria. Thus, although comparator 615 is illustrated as having a single output 620, comparator 615 can also include several outputs to output multiple digits in parallel.

For example, in implementations where activity that is responsive to relatively long duration input is to be identified, comparator 615 can identify digits in representations 120 that occur at different times during the duration of the input. For example, digits that are common to different feature matrices or vectors can be identified by comparator 615. The common digits can be output, e.g., in series or in parallel.

As another example, in implementations where activity that is responsive to relatively short duration input is to be identified, comparator 615 can identify digits in a representation 120 that occurs immediately after input of the short duration input but that are not present in other representations 120 that occur at other times. For example, comparator can subtract a feature matrix or vector that includes representations that occur shortly prior to the input of the short duration input from a feature matrix or vector that includes representations that occur shortly after the input.

As another example, in implementations where abstractions of fused input are to be identified, comparator 615 can be used to identify digits in a representation 120 that arise at a certain time after the input of the data. For example, a collection of remainder digits (i.e., digits that remain after subtraction of digits that arise a relatively short time after an input from digits that arise a relatively long time after an input) can be identified as abstractions that result from fusing the input from different sensors.

As another example, in implementations where the certainty of a decision or abstraction is to be measured, comparator 615 can be used to identify digits that reoccur or even become reinforced in different representations 120. The reoccurring or reinforced digits can be identified, e.g., after successive input of relatively slow changing data such as, e.g., a series of images that feature the same subject, a series of text snippets that share a textual characteristic (e.g., a subject, a theme, a tense), or the like. In some implementations, the reinforcement of digits can be identified based on the value of a non-binary digit, where the value reflects, e.g., the level of activity that forms a topological pattern and/or the duration of the topological pattern.

As another example, in implementations where an adversarial attack is to be identified, comparator 615 can be used to identify digits that occur soon after input and are progressively attenuated in subsequent representations 120. The attenuated digits can be identified, e.g., after successive input of relatively slow changing data such as, e.g., a series of images that may or may not feature the same subject, a series of text snippets, or the like. In some implementations, the attenuation of digits can be identified based on the value of a non-binary digit, where the value reflects, e.g., the level of activity that forms a topological pattern and/or the duration of the topological pattern.

Figure 7:
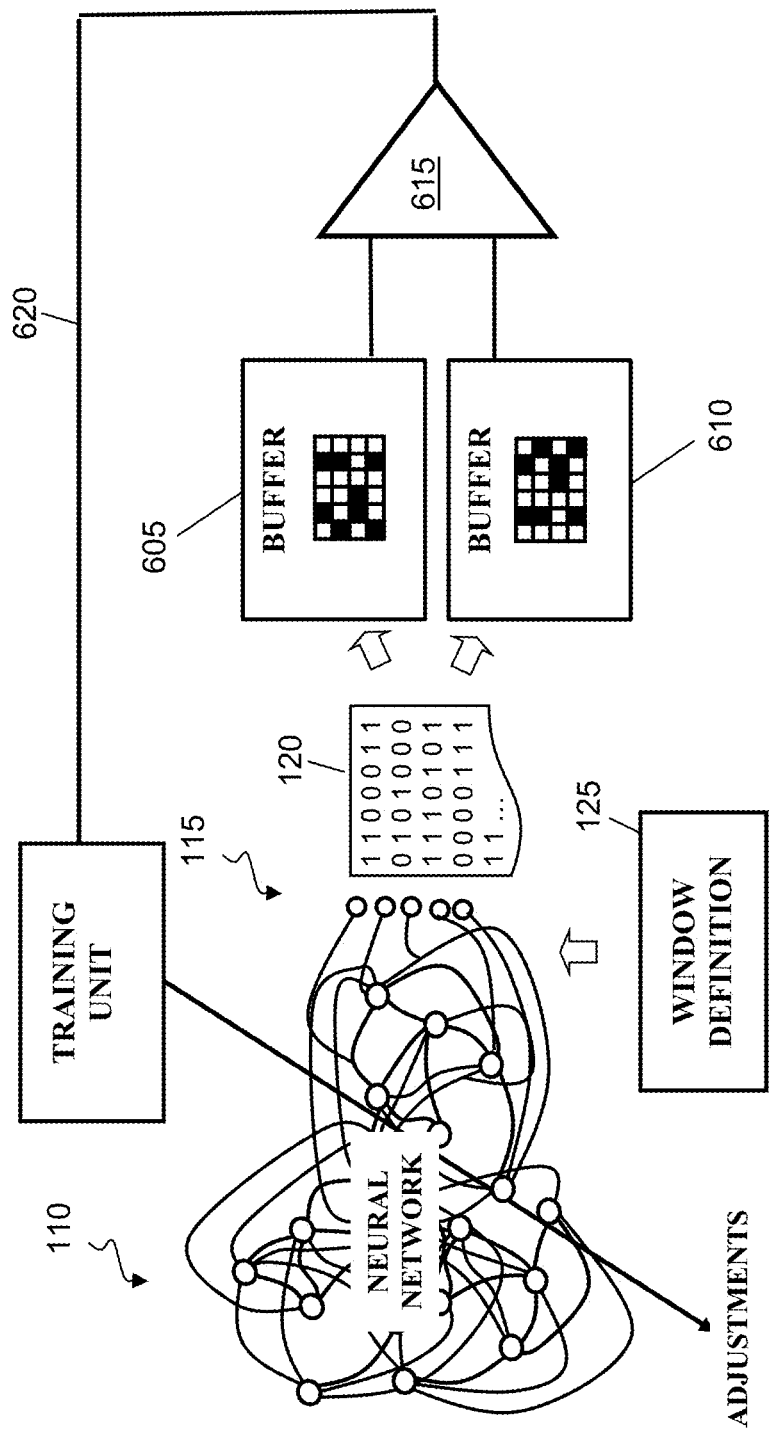
FIG. 7 is a schematic representation of how windows that are defined by window definition unit to identify adversarial attacks can be used to improve the resistance of network to adversarial attacks.

FIG. 7 is a schematic representation of how windows that are defined by window definition unit 125 to identify adversarial attacks can be used to improve the resistance of network 110 to adversarial attacks. In addition to data buffers 605, 610 and comparator 615, the illustrated implementation of system 100 includes a training unit 705.

Training unit 705 is a device that is configured to iteratively alter one or more attributes of recurrent neural network 110 based on digits that are determined to represent less robust decisions or abstractions in neural network 110. For example, topological patterns that occur soon after input can be progressively attenuated or even eliminated from subsequent representations 120. As another example, topological patterns that do not reoccur after successive input of, e.g., a series of images that feature the same subject a series of text snippets that share a textual characteristic can be progressively attenuated or even eliminated from subsequent representations 120.

In order to attenuate or eliminate the decisions or abstractions, training unit 705 can add or remove either nodes or links from neural network 110, change the weights of links, change the topological patterns that are represented in digit collection 120, or other modify recurrent neural network 110. In implementations where recurrent neural network 110 is a relatively complex neural network that is modelled on a biological system, training unit 705 can alter, e.g., morphological, chemical, or other characteristics of the model.

The training of recurrent neural network 110 to produce a more robust collection of digits 120 that, e.g., resists adversarial attack can be beneficial in ways that extend beyond mere identification of an (attempted) adversarial attack. For example, as discussed above, in recurrent neural networks that are used for image classification, susceptibility to adversarial attack can be taken as a sign that classes intersect in the region of the adversarial examples. By training recurrent neural network 110 to resist adversarial examples, the classes can be better defined.

Training may also be useful even in the absence of an adversarial attack, e.g., to ensure that neural network 110 is sufficiently insensitive to noise and/or sufficiently sensitive or insensitive to the content of input data.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations have been described. Nevertheless, it will be understood that various modifications may be made. Accordingly, other implementations are within the scope of the following claims.

What is claimed is:

1. A method comprising:
   defining a first window of time and a second window of time in a spiking recurrent artificial neural network, wherein the first window of time has a shorter duration than a duration of the second window of time;
   inputting data into the spiking recurrent artificial neural network, wherein the input data comprises first data that originates from a first sensor and second data that originates from a second sensor, wherein the first data occurs over a shorter duration than the second data;
   identifying occurrences of topological patterns of activity in a functional graph of the spiking recurrent artificial neural network during the first window of time, wherein the activity during the first window of time is responsive to the input data;
   identifying occurrences of topological patterns of activity in the functional graph of the spiking recurrent artificial neural network during the second window of time, wherein the activity during the second window of time is responsive to the input data; and
   outputting representations of the identified occurrences of topological patterns of activity identified during both the first window of time and the second window of time.

2. The method of claim 1, further comprising identifying, using the output representations, that a first of the topological patterns of activity that occurred in the first window of time reoccurred during the first window.

3. The method of claim 2, further comprising adjusting one or more characteristics of the spiking recurrent artificial neural network to reinforce occurrence of the first of the topological patterns in a subsequent representation output from the spiking recurrent artificial neural network, wherein the subsequent representation represents identified occurrences of topological patterns of activity responsive to the input data and identified during the first window of time and the second window of time.

4. The method of claim 1, further comprising identifying that a first of the topological patterns of activity that occurred during the first window does not reoccur in the second window.

5. The method of claim 4, further comprising eliminating a representation of the first of the topological patterns in a subsequent representation output from the spiking recurrent artificial neural network.

6. The method of claim 4, further comprising adjusting one or more characteristics of the spiking recurrent artificial neural network to attenuate the occurrence of the first topological pattern during the first window in a subsequent representation output from the spiking recurrent artificial neural network, wherein the subsequent representation represents identified occurrences of topological patterns of activity responsive to the input data and identified during the first window of time and the second window of time.

7. The method of claim 6, wherein adjusting the one or more characteristics of the spiking recurrent artificial neural network comprises adding or removing either nodes or links from the spiking recurrent neural network.

8. The method of claim 6, wherein adjusting the one or more characteristics of the spiking recurrent artificial neural network comprises changing a weights of links in the spiking recurrent artificial neural network.

9. The method of claim 1, wherein:
   the first data includes a still image or a temperature measurement; and
   the second data includes video data or audio data.

10. The method of claim 1, wherein the topological patterns of activity comprise directed cliques or directed simplices.

11. The method of claim 1, further comprising comparing a first of the representations of the occurrences of the topological patterns of activity that occurred during the first window with a second of the representations of the occurrences of the topological patterns of activity that occurred in the second window of time.

12. The method of claim 11, wherein comparing the first and the second representations comprises comparing values that reflect a level of activity of the represented topological patterns.

13. The method of claim 11, wherein comparing the first and the second representations comprises comparing values that reflect a duration of the represented topological patterns.

14. The method of claim 11, further comprising classifying, based on the comparison,
   a first decision that is represented by the first representation as less robust than
   a second decision that is represented by the second representation.

15. The method of claim 11, further comprising:
   classifying, based on a result of the comparison, a first decision that is represented by the first representation as a result of an adversarial attack.

16. The method of claim 11, wherein comparing the first and the second representations comprises:
   subtracting a first collection of binary digits from a second collection of binary digits, wherein each binary digit indicates whether a respective topological pattern occurred.

17. The method of claim 1, wherein the first window starts before the second window.

18. The method of claim 1, wherein the first data and the second data are either first and second images that feature a same subject or first and second text snippets that share a textual characteristic.

* * * * *